United States Patent
Chong et al.

(10) Patent No.: US 12,549,496 B2
(45) Date of Patent: Feb. 10, 2026

(54) METHOD FOR ALLOCATING RESOURCE FOR COMPUTING TASK

(71) Applicant: VIVO MOBILE COMMUNICATION CO., LTD., Dongguan (CN)

(72) Inventors: Weiwei Chong, Dongguan (CN); Yanchao Kang, Dongguan (CN); Xiaobo Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/437,552

(22) Filed: Feb. 9, 2024

(65) Prior Publication Data

US 2024/0187353 A1 Jun. 6, 2024

Related U.S. Application Data

(63) Continuation of application No. PCT/CN2022/111188, filed on Aug. 9, 2022.

(30) Foreign Application Priority Data

Aug. 10, 2021 (CN) .......................... 202110914916.8

(51) Int. Cl.
*H04L 47/80* (2022.01)
(52) U.S. Cl.
CPC .................................. *H04L 47/805* (2013.01)
(58) Field of Classification Search
CPC ............. H04L 47/805; H04L 41/0894; H04W 72/044; H04W 52/265; H04W 24/02
USPC ........................................................ 709/226
See application file for complete search history.

(56) References Cited

U.S. PATENT DOCUMENTS

| 10,719,369 | B1 | 7/2020 | Aithal et al. |
| 2002/0046284 | A1* | 4/2002 | Brabson .................. H04L 47/70 709/228 |
| 2011/0292792 | A1* | 12/2011 | Zuo ....................... H04L 47/215 370/230 |
| 2013/0283289 | A1 | 10/2013 | Adinarayan et al. |
| 2019/0394812 | A1 | 12/2019 | Kuo et al. |
| 2020/0081992 | A1* | 3/2020 | Lynch ............... G06F 16/24578 |
| 2021/0105338 | A1* | 4/2021 | Oyman ................... H04L 67/61 |
| 2021/0126874 | A1* | 4/2021 | Glasco .................... G06F 9/542 |

(Continued)

FOREIGN PATENT DOCUMENTS

| CN | 110830282 A | 2/2020 |
| CN | 110995614 A | 4/2020 |

(Continued)

OTHER PUBLICATIONS

Machine translation of CN 111866162 (Year: 2020).*
Machine translation of CN 113115332 (Year: 2021).*

*Primary Examiner* — Ruolei Zong
(74) *Attorney, Agent, or Firm* — The Webb Law Firm

(57) ABSTRACT

A method for allocating a resource for a computing task includes obtaining, by a computing power control network element, a first computing task request, where the first computing task request is used to request to allocate a computing power resource for a target computing task of a terminal device, and the first computing task request includes task information of the target computing task; and allocating, by the computing power control network element, the computing power resource for the target computing task based on the task information.

17 Claims, 10 Drawing Sheets

(56) References Cited

U.S. PATENT DOCUMENTS

| | | | |
|---|---|---|---|
| 2021/0385633 A1 | | 12/2021 | Wang et al. |
| 2023/0108693 A1 | * | 4/2023 | Cao .................... H04W 72/543 |
| 2023/0276430 A1 | | 8/2023 | Hong |

FOREIGN PATENT DOCUMENTS

| | | | | |
|---|---|---|---|---|
| CN | 111866162 A | | 10/2020 | |
| CN | 111869303 A | | 10/2020 | |
| CN | 113115332 A | * | 7/2021 | ............ H04W 24/02 |
| CN | 111866162 B | * | 2/2022 | ......... H04L 67/1023 |
| EP | 3148140 A1 | | 3/2017 | |
| WO | 2016144220 A1 | | 9/2016 | |
| WO | WO-2021212347 A1 | * | 10/2021 | ............. G06N 3/098 |

* cited by examiner

2

METHOD FOR ALLOCATING RESOURCE FOR COMPUTING TASK

CROSS-REFERENCE TO RELATED APPLICATIONS

This application is a Bypass Continuation Application of International Patent Application No. PCT/CN2022/111188, filed Aug. 9, 2022, and claims priority to Chinese Patent Application No. 202110914916.8, filed Aug. 10, 2021, the disclosures of which are hereby incorporated by reference in their entireties.

BACKGROUND OF THE INVENTION

Field of the Invention

This application pertains to the field of communications technologies, and particularly relates to a method and an apparatus for allocating a resource for a computing task, a network element, and a medium.

Description of Related Art

In the communications technologies, because user equipment (UE) needs to perform data transmission, the UE initiates a packet data unit (PDU) session establishment procedure to a network side (for example, sending to a session management network element (SMF) via a mobility management network element (AMF)). The terminal device allocates a PDU session ID and reports the PDU session ID to the network side.

SUMMARY OF THE INVENTION

According to a first aspect, a method for allocating a resource for a computing task is provided. The method includes: obtaining, by a computing power control network element, a first computing task request, where the first computing task request is used to request to allocate a computing power resource for a target computing task of a terminal device, and the first computing task request includes task information of the target computing task; and allocating, by the computing power control network element, the computing power resource for the target computing task based on the task information.

According to a second aspect, a method for allocating a resource for a computing task is provided. The method includes: obtaining, by a session management network element, a second computing task request, where the second computing task request is used to request to allocate a communication resource for a target computing task of a terminal device, and the second computing task request includes task information of the target computing task; and allocating, by the session management network element, the communication resource for the target computing task based on the task information.

According to a third aspect, a method for allocating a resource for a computing task in a network is provided. The method includes: obtaining, by a mobility management network element, a third computing task request, where the third computing task request includes task information of a target computing task of a terminal device; sending, by the mobility management network element, a first computing task request to a computing power control network element, where the first computing task request is used to request to allocate a computing power resource and/or a communication resource for the target computing task; and/or sending, by the mobility management network element, a second computing task request to a session management network element, where the second computing task request is used to request to allocate a communication resource and/or a computing power resource for the target computing task.

According to a fourth aspect, a method for allocating a resource for a computing task in a network is provided. The method includes: obtaining, by a policy control network element, a target quality of service (QoS) policy request, where the target QoS policy request is used to request the policy control network element to generate a target QoS policy corresponding to a target computing task, and the target QoS policy request includes task information of the target computing task; and generating, by the policy control network element based on the task information, the target QoS policy corresponding to the target computing task, where the target QoS policy includes at least one of the following: a computing power QoS policy or a communication QoS policy.

According to a fifth aspect, a method for allocating a resource for a computing task in a network is provided. The method includes: initiating, by a terminal device, a computing task request to a network-side device, where the computing task request is used to request to allocate a communication resource and/or a computing power resource for a target computing task of the terminal device, and the computing task request includes task information of the target computing task; and obtaining, by the terminal device, a computing task response from the network-side device, where the computing task response includes network element information of a computing network element corresponding to the computing power resource allocated for the target computing task, and/or information about the communication resource allocated for the target computing task.

According to a sixth aspect, an apparatus for allocating a resource for a computing task is provided. The apparatus includes: an obtaining module, configured to obtain a first computing task request, where the first computing task request is used to request to allocate a computing power resource for a target computing task of a terminal device, and the first computing task request includes task information of the target computing task; and an allocation module, configured to allocate the computing power resource for the target computing task based on the task information.

According to a seventh aspect, an apparatus for allocating a resource for a computing task is provided. The apparatus includes: an obtaining module, configured to obtain a second computing task request, where the second computing task request is used to request to allocate a communication resource for a target computing task of a terminal device, and the second computing task request includes task information of the target computing task; and an allocation module, configured to allocate the communication resource for the target computing task based on the task information.

According to an eighth aspect, an apparatus for allocating a resource for a computing task in a network is provided. The apparatus includes: an obtaining module, configured to obtain a third computing task request, where the third computing task request includes task information of a target computing task of a terminal device; and a sending module, configured to send a first computing task request to a computing power control network element, where the first computing task request is used to request to allocate a computing power resource and/or a communication resource for the target computing task; and/or send a second computing task request to a session management network element, where the second computing task request is used to request to allocate a communication resource and/or a computing power resource for the target computing task.

According to a ninth aspect, an apparatus for allocating a resource for a computing task in a network is provided. The apparatus includes: an obtaining module, configured to obtain a target QoS policy request, where the target QoS policy request is used to request the policy control network element to generate a target QoS policy corresponding to a target computing task, and the target QoS policy request includes task information of the target computing task; and a generation module, configured to generate, based on the task information, the target QoS policy corresponding to the target computing task, where the target QoS policy includes at least one of the following: a computing power QoS policy or a communication QoS policy.

According to a tenth aspect, an apparatus for allocating a resource for a computing task in a network is provided. The apparatus includes: a sending module, configured to initiate a computing task request to a network-side device, where the computing task request is used to request to allocate a communication resource and/or a computing power resource for a target computing task of the terminal device, and the computing task request includes task information of the target computing task; and an obtaining module, configured to obtain a computing task response from the network-side device, where the computing task response includes network element information of a computing network element corresponding to the computing power resource allocated for the target computing task, and/or information about the communication resource allocated for the target computing task.

According to an eleventh aspect, a computing power control network element is provided. The computing power control network element includes a processor, a memory, and a program or instructions stored in the memory and executable on the processor. When the program or instructions are executed by the processor, the steps of the method according to the first aspect are implemented.

According to a twelfth aspect, a computing power control network element is provided and includes a processor and a communication interface. The processor is configured to obtain a first computing task request, where the first computing task request is used to request to allocate a computing power resource for a target computing task of a terminal device, and the first computing task request includes task information of the target computing task; and further configured to allocate the computing power resource for the target computing task based on the task information.

According to a thirteenth aspect, a session management network element is provided. The session management network element includes a processor, a memory, and a program or instructions stored in the memory and executable on the processor. When the program or instructions are executed by the processor, the steps of the method according to the second aspect are implemented.

According to a fourteenth aspect, a session management network element is provided and includes a processor and a communication interface. The processor is configured to obtain a second computing task request, where the second computing task request is used to request to allocate a communication resource for a target computing task of a terminal device, and the second computing task request includes task information of the target computing task; and further configured to allocate the communication resource for the target computing task based on the task information.

According to a fifteenth aspect, a mobility management network element is provided. The mobility management network element includes a processor, a memory, and a program or instructions stored in the memory and executable on the processor. When the program or instructions are executed by the processor, the steps of the method according to the third aspect are implemented.

According to a sixteenth aspect, a mobility management network element is provided and includes a processor and a communication interface. The processor is configured to obtain a third computing task request, where the third computing task request includes task information of a target computing task of a terminal device. The communication interface is configured to send a first computing task request to a computing power control network element, where the first computing task request is used to request to allocate a computing power resource and/or a communication resource for the target computing task; and/or configured to send a second computing task request to a session management network element, where the second computing task request is used to request to allocate a communication resource and/or a computing power resource for the target computing task.

According to a seventeenth aspect, a policy control network element is provided. The policy control network element includes a processor, a memory, and a program or instructions stored in the memory and executable on the processor. When the program or instructions are executed by the processor, the steps of the method according to the fourth aspect are implemented.

According to an eighteenth aspect, a policy control network element is provided and includes a processor and a communication interface. The processor is configured to obtain a target QoS policy request, where the target QoS policy request is used to request the policy control network element to generate a target QoS policy corresponding to a target computing task, and the target QoS policy request includes task information of the target computing task; and further configured to generate, based on the task information, the target QoS policy corresponding to the target computing task, where the target QoS policy includes at least one of the following: a computing power QoS policy or a communication QoS policy.

According to a nineteenth aspect, a terminal device is provided. The terminal device includes a processor, a memory, and a program or instructions stored in the memory and executable on the processor. When the program or instructions are executed by the processor, the steps of the method according to the fifth aspect are implemented.

According to a twentieth aspect, a terminal device is provided and includes a processor and a communication interface. The communication interface is configured to initiate a computing task request to a network-side device, where the computing task request is used to request to allocate a communication resource and/or a computing power resource for a target computing task of the terminal device, and the computing task request includes task information of the target computing task. The communication interface is configured to obtain a computing task response from the network-side device, where the computing task response includes network element information of a computing network element corresponding to the computing power resource allocated for the target computing task, and/or information about the communication resource allocated for the target computing task.

According to a twenty-first aspect, a non-transitory readable storage medium is provided. The non-transitory readable storage medium stores a program or instructions. When the program or instructions are executed by a processor, the steps of the method according to any one of the first aspect to the fifth aspect are implemented.

According to a twenty-second aspect, a chip is provided. The chip includes a processor and a communication interface. The communication interface is coupled to the processor. The processor is configured to run a program or instructions to implement the method according to any one of the first aspect to the fifth aspect.

According to a twenty-third aspect, a computer program or program product is provided. The computer program or program product is stored in a non-volatile storage medium. The program or program product is executed by at least one processor to implement the steps of the method according to any one of the first aspect to the fifth aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
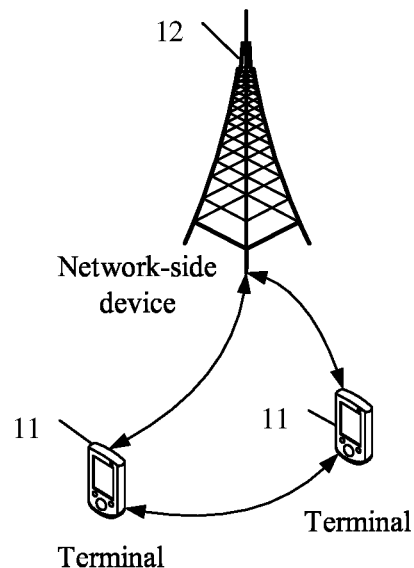
FIG. 1 is a schematic diagram of a possible architecture of a communications system according to an embodiment of this application.

FIG. 1 is a block diagram of a wireless communications system to which an embodiment of this application may be applied. The wireless communications system includes a terminal 11 and a network-side device 12. The terminal 11 may be a terminal-side device such as UE, a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, a vehicular device (VUE), a pedestrian terminal (PUE), or a smart home (a home device having a wireless communication function, such as a refrigerator, a television, a washing machine, or furniture). The wearable device includes a smart watch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, a game console, or the like. It should be noted that a type of the terminal 11 is not limited in the embodiments of this application.

For example, the network-side device 12 may include at least one of the following: a policy control network element, a mobility management network element, a session management network element, or a computing power control network element.

For example, in a 5G system, the policy control network element may be a policy control function network element (PCF); the mobility management network element may be an AMF; the session management network element may be an SMF; and the computing power control network element may be a network element capable of allocating a computing power resource. It should be noted that in other systems, the network elements may be network elements having a same function or belonging to a same type, but names may be different from the foregoing network element names. This is not limited in the embodiments of this application. It should be noted that the policy control network element in the embodiments of this application may be deployed independently as an independent logical module, or may be a sub-functional module in the session management network element. This is not limited in the embodiments of this application.

In addition, if functions of the session management network element and the policy control network element are integrated in a same network element device, steps of interaction between the session management network element and the policy control network element may be omitted or combined. For example, the step in which the session management network element sends a communication QoS policy request to the policy control network element may be omitted.

For example, the network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. As long as the same technical effect is achieved, the base station is not limited to specific technical terms. It should be noted that in the embodiments of this application, only a base station in an NR system is used as an example, but a type of the base station is not limited.

It should be noted that the steps in the embodiments of this application are described for illustrative purposes. It does not necessarily mean that the steps are mandatory for execution.

The following describes technical terms used in the technical solutions provided in the embodiments of this application.

1. Service Requirement of a Computing Task (Computing Service).

It may be understood that the service requirement of the computing task originates from a requirement of a computing task of a terminal device. The concept is similar to obtaining a computation result with higher accuracy and less time.

For example, the service requirement of the computing task includes but is not limited to the following measurement information:

(1) Success rate of the computing task=Computation reliability (platform computation reliability)*Bit error rate of data transmission. The success rate of the computing task is used to represent overall accuracy of the computing task.

(2) Delay of the computing task=Computation delay+ Transmission delay. The delay of the computing task is used to represent an overall delay required for completing the computing task.

For example, a network side may generate network requirements based on the service requirement of the computing task, where the network requirements include a communication quality of service QoS requirement and a computing power quality of service QoS requirement.

2. Computing Power QoS

For example, the computing power QoS includes but is not limited to at least one of the following measurement dimensions of computing power quality:

i. computation delay, used to represent the time needed for task computing by a computing power resource node; or
  ii. computation reliability, used to represent accuracy of task computing by the computing power resource node.

3. Communication QoS

For example, the communication QoS includes but is not limited to at least one of the following measurement dimensions of communication transmission quality:

i. transmission delay;
  ii. bandwidth; or
  iii. bit error rate.

For example, a computing session is a special session between UE and a computing power control node or the computing power resource node. User plane data transmission in the computing session is carried in a packet data unit PDU session, that is, a channel of the PDU session is used to transmit the user plane data to the computing power resource node for computation. A computing session identifier ID identifies the computing session, and is allocated by the UE and sent to the network when the computing session is established. The computing session ID is in a one-to-one binding relationship with a PDU session ID. After the UE determines the binding relationship, the computing session ID is sent to the network when the computing session is established.

For example, the PDU session ID is a session management layer ID between the UE and an SMF.

For example, a correspondence between the computing session and the PDU session is as follows: There is a one-to-one correspondence between the computing session and the PDU session; and there is a one-to-one correspondence between the computing session and a QoS flow/bearer.

A method for allocating a resource for a computing task according to the embodiments of this application is hereinafter described in detail by using some embodiments and application scenarios thereof with reference to the accompanying drawings.

At present, in the PDU session establishment procedure, the SMF allocates a corresponding transmission resource for a PDU session of the terminal device (including selecting a user plane function network element (UPF) and triggering establishment of a user plane tunnel). Therefore, the terminal device can use the user plane tunnel corresponding to the established PDU session to transmit data.

However, a current operator network can provide only a data transmission tunnel with certain quality of service assurance (the tunnel is used for data transmission between a terminal device and a target node), but does not provide or expose a computing power resource for the terminal device.

Figure 2:
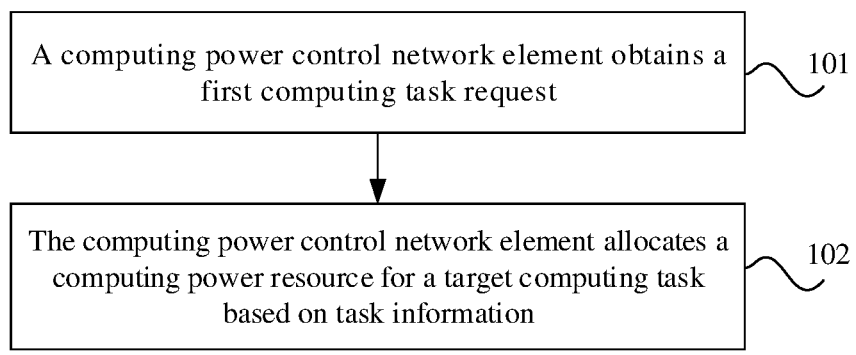
FIG. 2 is a first schematic flowchart of a method for allocating a resource for a computing task according to an embodiment of this application.

An embodiment of this application provides a method for allocating a resource for a computing task. The method is applied to a computing power control network element. As shown in FIG. 2, the method includes the following step 101 and step 102.

Step 101: A computing power control network element obtains a first computing task request.

The first computing task request is used to request to allocate a computing power resource for a target computing task of user equipment UE. The first computing task request includes task information of the target computing task.

It should be noted that an implementation form of the first computing task request may be a computing session establishment request message, a computing power request message, or a PDU session establishment request. In other words, the foregoing message names may include the foregoing information element content.

It should be noted that the computing session establishment request message and the computing power request message may be new message types, which are used to request the network to allocate the corresponding computing power resource for the computing task; and the messages may carry related PDU session information (such as a PDU session ID), used to notify the network that while the computing power resource is allocated, a corresponding PDU session resource also needs to be allocated for transmitting data of the computing task.

It should be noted that the PDU session establishment request is optimized and enhanced based on an existing message procedure and is used to request the network to allocate the PDU session resource for transmitting the data of the computing task. In addition, the PDU session establishment request carries computing task information and is also used to request the network to allocate the computing power resource.

Optionally, in this embodiment of this application, the task information includes at least one of the following: computing task identification information, packet data unit PDU session identification information corresponding to the computing task, request type information corresponding to a PDU session, computing task description information, a data network name (DNN), or single network slice selection assistance information (S-NSSAI), where the request type information corresponding to the PDU session is used to indicate that the PDU session is a session used for transmitting data related to the computing task.

For example, the computing task identification information may include a terminal device ID and a session ID of a computing session. The packet data unit PDU session identification information corresponding to the computing task may include the PDU session ID corresponding to the computing task. The S-NSSAI may be slice identification information corresponding to the computing task.

For example, the computing task description information includes at least one of the following: a type of the computing task, a purpose of the computing task, a service requirement of the computing task, an Internet protocol (IP) address of the computing task, or port number information corresponding to the computing task.

For example, the service requirement of the computing task includes at least one of the following: a delay requirement of the computing task (for example, a delay of the computing task is 10 ms) or an accuracy requirement of the computing task (for example, an error rate of the computing task does not exceed 0.1%).

In this way, the computing power control network element can obtain data (that is, task information) related to the target computing task of the terminal device from the first computing task request, and subsequently generate a network requirement based on the task information, so that the network can generate a resource allocation policy meeting the network requirement and then allocate the corresponding computing power resource for the computing task of the terminal device to complete the computing task.

Step 102: The computing power control network element allocates the computing power resource for the target computing task based on the task information.

In this embodiment of this application, the computing power resource includes at least one of the following: a computing resource or a storage resource. For example, at least 100 units of GPU resources are allocated for computing of the target computing task. For example, 100 units of storage resources are allocated for storage.

Optionally, in this embodiment of this application, step 102 may include the following step 102*a*.

Step 102*a*: The computing power control network element selects a computing network element based on the task information.

The computing network element is capable of providing the computing power resource corresponding to the target computing task.

For example, the computing power control network element allocates and selects the computing network element based on the task information of the target computing task. It should be noted that the computing network element has a computing function and a storage function. The two functions may be deployed together on a same network element, or may be deployed independently on different network elements. In other words, the computing network element may include one network element or a plurality of network elements.

It should be noted that the computing power control network element needs to ensure that a computing capability of a selected computing function network element can meet a computing resource requirement (for example, at least 100 units of GPU resources, supporting an algorithm (for example, a deep neural network (DNN))) in a computing power QoS policy; and/or the computing power control network element needs to ensure that a storage capability of a selected storage function network element can meet a storage resource requirement (for example, 100 units of storage resources) in the computing power QoS policy.

For example, with reference to the computing power QoS policy configured in the computing power control network element, the computing power control network element selects an appropriate computing network element based on the service requirement of the target computing task in the task information of the target computing task to ensure that a computation delay in completing the corresponding target computing task by the computing network element is not higher than the delay requirement in the service requirement, and/or ensure that accuracy of completing the target computing task by the computing network element is not lower than the accuracy requirement in the service requirement.

Optionally, in this embodiment of this application, the method for allocating a resource for a computing task according to this embodiment of this application further includes the following step 103.

Step 103: The computing power control network element obtains the computing power QoS policy corresponding to the target computing task.

For example, the computing power QoS policy meets a computing power QoS requirement of the target computing task.

For example, the computing power QoS policy includes at least one of the following measurement dimensions: computing power, a sample data volume, storage, a computation delay, computation accuracy, or a computation speed.

Optionally, with reference to step 103, step 102 may include the following step 102*a*.

Step 102*a*: The computing power control network element allocates the computing power resource for the target computing task based on the task information of the target computing task and the computing power QoS policy.

For example, the computing power control network element may select an appropriate computing network element based on the computing power QoS policy.

Optionally, in this embodiment of this application, the process in which the computing power control network element obtains the computing power QoS policy corresponding to the target computing task may be implemented in two implementations:

First possible implementation (requesting the computing power QoS policy from a policy control network element):

For example, step 103 may include the following step 103*a*1 and step 103*a*2.

Step 103*a*1: The computing power control network element sends a computing power QoS policy request to the policy control network element, where the computing power QoS policy request is used to request the computing power QoS policy corresponding to the target computing task.

Step 103*a*2: The computing power control network element obtains the computing power QoS policy from the policy control network element.

For example, the computing power control network element sends the computing power QoS policy request to the policy control network element to request the computing power QoS policy of the target computing task. For example, the computing power control network element sends a computing policy request message to the policy control network element to request a dynamic policy applicable to the target computing task, where the dynamic policy includes the computing power QoS policy.

For example, the computing power QoS policy request includes the computing task identification information, the DNN, the S-NSSAI, and other information. Optionally, the computing task identification information includes the terminal device ID and the computing session ID. The computing power QoS policy request further includes at least one of the following information: the associated PDU session ID or the service requirement of the computing task.

For example, step 103*a*1 may include: the computing power control network element sends the computing power QoS policy request to the policy control network element through a session management network element. Correspondingly, step 103*a*2 may include: the computing power control network element obtains the computing power QoS policy from the policy control network element through the session management network element.

Second possible implementation (actively generating the computing power QoS policy by itself):

For example, step 103 may include the following step 103*b*1.

Step 103*b*1: The computing power control network element determines, based on the service requirement of the computing task included in the task information of the target computing task, the computing power QoS policy corresponding to the target computing task.

For example, if dynamic PCC is not deployed, the computing power QoS policy may be determined based on the task information of the computing task and determined by the computing power control network element based on an internal configuration policy.

Optionally, in this embodiment of this application, step 101 may include the following step 101*a*.

Step 101*a*: The computing power control network element obtains the first computing task request from a first device.

The first device includes any one of the following: a mobility management network element, a session management network element, and an access network device.

For example, the computing power control network element may obtain, from an RAN (that is, an access network or a base station), the first computing task request corresponding to the target computing task of the terminal device. It should be noted that the computing power control network element can directly open an interface with the base station, and the terminal device can directly access the computing power control network element through the base station.

Optionally, in this embodiment of this application, after step 101, the method for allocating a resource for a computing task according to this embodiment of this application further includes the following step 104.

Step 104: The computing power control network element sends a first computing task response to the terminal device.

The first computing task response includes network element information of a computing network element corresponding to the computing power resource, and the network element information includes network element identification information or network element address information. For example, the network element identification information is used to address the computing network element, and may be a fully qualified domain name (FQDN) of the network element, or the like; and the network element address information may be IP address information of the network element.

For example, the network element address information may include an IP address corresponding to the computing network element selected by the computing power control network element for the target computing task of the terminal device. The IP address of the computing network element is used as a destination IP address of computing task data to be sent in an uplink by the terminal device, to ensure that the computing task data can be transmitted to the computing network element for computation.

For example, the computing power control network element sends the corresponding first computing task response to the user equipment to notify the terminal device that the computing task request has been accepted by the network.

For example, the first computing task response further includes associated PDU session identification information. The PDU session identification information may include a PDU session ID.

Optionally, in this embodiment of this application, the process of step 104 may include the following step 104*a*.

Step 104*a*: The computing power control network element sends the first computing task response to the terminal device through a first device.

The first device includes any one of the following: a mobility management network element, a session management network element, and an access network device.

Optionally, in this embodiment of this application, the session management network element and the computing power control network element may exchange allocation status information to notify each other of respective resource allocation status information.

For example, the method for allocating a resource for a computing task according to this embodiment of this application further includes the following step 105.

Step 105: The computing power control network element sends allocation status information of the computing power resource to a session management network element; and/or the computing power control network element receives allocation status information of a communication resource from a session management network element.

For example, the allocation status information may indicate whether the corresponding computing power resource or communication resource has been allocated, the type and quantity of allocated resources, corresponding QoS that can be achieved, and the like.

For example, the session management network element may notify the computing power control network element of a UPF selected by the session management network element, where the UPF is used by the computing power control network element to measure a data transmission delay between each computing network element and the UPF, and used by the computing power control network element to estimate a remaining space of the computation delay, so that the computing power control network element can finally select a computing network element that can meet the remaining delay requirement.

For example, the session management network element is an SMF. The SMF notifies the computing network element that the SMF has selected UPF 1 and that corresponding delays in the RAN and CN are 2 ms and 3 ms respectively. There are three available computing network elements under the computing power control network element. Transmission delays between UPF 1 and the three available computing network elements are 1 ms, 2 ms, and 3 ms respectively, and delays in completing the target computing task by the three computing network elements are 3 ms, 5 ms, and 8 ms. Therefore, corresponding total delays are 9 ms, 12 ms, and 16 ms. If a total delay requirement required in the service requirement of the computing task is 10 ms, the computing power control network element selects the first computing network element to carry the subsequent computing task.

It should be noted that the foregoing example assumes that the session management network element notifies the computing power control network element of the UPF selected by the session management network element and corresponding information. Likewise, a method for notifying, by the computing power control network element, the SMF of the computing network element selected by the computing power control network element is also similar.

In the method for allocating a resource for a computing task according to this embodiment of this application, the computing power control network element can obtain the first computing task request, and allocate the computing power resource for the target computing task of the terminal device based on the task information of the target computing task of the terminal device that is included in the first computing task request. In this way, an ordinary terminal device can complete a computing task without having a strong computing capability, thereby reducing costs, power consumption, and the like of the terminal device.

Figure 3:
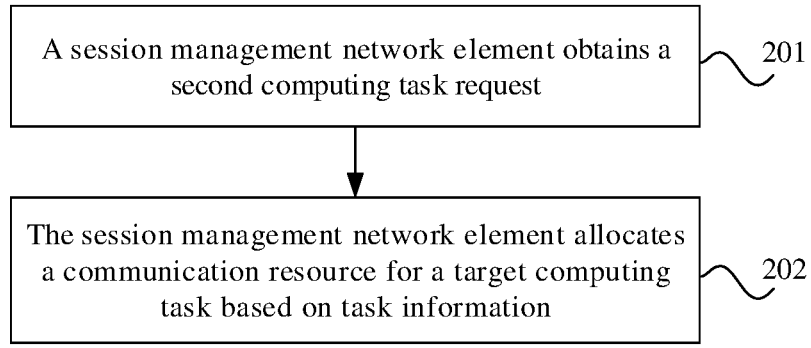
FIG. 3 is a second schematic flowchart of a method for allocating a resource for a computing task according to an embodiment of this application.

An embodiment of this application provides a method for allocating a resource for a computing task. The method is applied to a session management network element (SMF). As shown in FIG. 3, the method includes the following step 201 and step 202.

Step 201: A session management network element obtains a second computing task request.

The second computing task request is used to request to allocate a communication resource for a target computing task of a terminal device, and the second computing task request includes task information of the target computing task.

Optionally, in this embodiment of this application, the second computing task request message may be a session establishment request message.

Optionally, in this embodiment of this application, the task information includes at least one of the following: computing task identification information, packet data unit PDU session identification information corresponding to the computing task, request type information corresponding to a PDU session, or computing task description information. The request type information corresponding to the PDU session is used to indicate that the PDU session is a session for transmitting data related to the computing task.

For example, the computing task identification information may include a terminal device ID and a PDU session ID, and the packet data unit PDU session identification information corresponding to the computing task may include a PDU session ID corresponding to the computing task.

For example, the computing task description information includes at least one of the following: a type of the computing task, a purpose of the computing task, a service requirement of the computing task, an IP address of the computing task, or port number information corresponding to the computing task.

Optionally, the second computing task request message may further include a DNN and S-NSSAI.

Step 202: The session management network element allocates the communication resource for the target computing task based on the task information.

Optionally, in this embodiment of this application, the process of step 202 may include the following step 202a.

Step 202a: The session management network element establishes a tunnel in a packet data unit PDU session for the terminal device based on the task information.

The tunnel in the PDU session is used to transmit data of the target computing task.

For example, the session management network element may select or reselect a UPF, and establish or modify a corresponding N4 session and N3 tunnel. Data of the subsequent computing task is transmitted on a user plane tunnel. Optionally, the user plane tunnel may include an air interface user plane tunnel and an N3 tunnel.

It should be noted that for details about the establishment or modification of the corresponding N4 session and N3 tunnel, reference may be made to the establishment procedure or modification procedure of the N4 session and N3 tunnel in the communications technologies.

Optionally, in this embodiment of this application, the method for allocating a resource for a computing task according to this embodiment of this application further includes the following step 203.

Step 203: The session management network element obtains a communication QoS policy of the target computing task.

In an example, the session management network element obtains the communication QoS policy fed back by a policy control network element. Optionally, the session management network element obtains an SM policy fed back by the policy control network element, where the SM policy includes the communication QoS policy corresponding to the target computing task.

In another example, the session management network element may determine the communication QoS policy of the target computing task by itself based on the service requirement of the target computing task. Optionally, the session management network element may determine the communication QoS policy of the target computing task based on the service requirement of the target computing task in combination with an SM policy configured in the session management network element.

For example, after obtaining the communication QoS policy of the target computing task, the session management network element may select or reselect the UPF based on the communication QoS policy, and establish or modify the corresponding N4 session and N3 tunnel.

Optionally, with reference to step 203, the process of step 202 may include the following step 202b.

Step 202b: The session management network element allocates the communication resource for the target computing task based on the task information and the communication QoS policy of the target computing task.

For example, the session management network element selects or reselects the UPF based on the communication QoS policy, and establishes or modifies the corresponding N4 session and N3 tunnel for the terminal device.

Optionally, in this embodiment of this application, the process of step 203 may include the following step 203a and step 203b.

Step 203a: The session management network element sends a communication QoS policy request to a policy control network element.

The communication QoS policy request is used to request the policy control network element to generate the communication QoS policy corresponding to the target computing task.

Step 203b: The session management network element obtains the communication QoS policy from the policy control network element.

For example, the session management network element may send the communication QoS policy request to the policy control network element to request the communication QoS policy applicable to the target computing task.

For example, the communication QoS policy request includes the terminal device ID, the PDU session ID, the DNN, the S-NSSAI, and other information. Optionally, the message further includes at least one of the following information: an associated computing session ID, or the service requirement of the computing task.

For example, the session management network element may send the service requirement of the target computing task and a computing power QoS policy to the policy control network element, and the policy control network element determines a finally allocated communication QoS policy based on the two and then sends the determined communication QoS policy to the session management network element.

Optionally, in this embodiment of this application, the method for allocating a resource for a computing task according to this embodiment of this application further includes the following step 204a to step 204d.

Step 204a: The session management network element receives a computing power QoS policy request from a computing power control network element.

The computing power QoS policy request is used to request a computing power QoS policy corresponding to the target computing task.

Step 204b: The session management network element sends the computing power QoS policy request to a policy control network element.

Step 204c: The session management network element obtains the computing power QoS policy from the policy control network element.

Step 204d: The session management network element sends the computing power QoS policy to the computing power control network element.

For example, the computing power QoS policy request includes the terminal device ID, the PDU session ID, the DNN, the S-NSSAI, and other information. Optionally, the message further includes at least one of the following information: an associated computing session ID, the service requirement of the computing task, or identifier or address information of the computing power control network element.

Optionally, in this embodiment of this application, the task information includes the service requirement of the target computing task. For example, step 203 may include the following step 203c.

Step 203c: The session management network element determines, based on the service requirement of the target computing task, the communication QoS policy corresponding to the target computing task.

For example, the communication QoS policy may also be statically configured in the session management network element.

Optionally, step 203c may include the following step 203c1.

Step 203c1: The session management network element determines, based on the service requirement of the target computing task and a computing power QoS policy corresponding to the target computing task, the communication QoS policy corresponding to the target computing task.

For example, the computing power QoS policy is determined by the computing power control network element based on an internal configuration policy and notified to the session management network element through information exchange between the session management network element and the computing power control network element, and the SMF obtains communication QoS through computation based on the internal configuration policy and the computing power QoS policy.

For example, the service requirement of the target computing task requires that a total computation delay should be less than 20 ms, but computing power QoS information reflects that a computation delay of the computing network element needs to be 5 ms. In this case, the SMF learns, through computation. that a total delay in data transmission in the communication QoS (a delay from UE to the computing network element) should not exceed 15 ms.

For another example, the service requirement of the target computing task requires that total computation accuracy should be greater than 96%, but computing power QoS information reflects that computation accuracy of the computing network element is 98%. In this case, the SMF learns, through computation, that a PER in the communication QoS should not be higher than 2.04%.

It should be noted that other QoS indicators are obtained through computation in similar ways. Same as in the communications technologies, among communication QoS indicators generated by the SMF, some need to be sent to the UE as a QoS policy, some need to be sent to an RAN as a QoS profile, and some need to be sent to the UPF as QoS enforcement for execution.

Optionally, in this embodiment of this application, step 201 may include the following step 201a.

Step 201*a*: The session management network element obtains the second computing task request from a mobility management network element.

For example, as compared with the communications technologies in which a mobility management network element forwards a PDU session establishment request initiated by a terminal device to a session management network element, in this embodiment of this application, if the terminal device sends a computing session establishment request message or a computing power request message instead of a PDU session establishment request, the mobility management network element herein needs to filter out PDU session information (such as the PDU session ID) and actively trigger a PDU session establishment request to the session management network element, where the request may include the PDU session ID and the terminal device ID.

Optionally, the second computing task request may further include at least one of the following information: the request type information corresponding to the PDU session, the associated computing session ID, the type of the computing task, the purpose of the computing task, the service requirement of the target computing task, the DNN, slice identification information, or the like, where the request type information corresponding to the PDU session indicates that the PDU session is a session for transmitting data of the target computing task.

Optionally, in this embodiment of this application, the method for allocating a resource for a computing task according to this embodiment of this application further includes the following step 205.

Step 205: The session management network element sends a second computing task response to the terminal device.

The second computing task response includes some or all information of communication QoS corresponding to the target computing task.

For example, the second computing task response includes an IP address corresponding to the computing network element selected by the computing power control network element for the target computing task of the terminal device. The IP address of the computing network element is used as a destination IP address of task data of the target computing task to be sent in an uplink by the terminal device, to ensure that the task data of the target computing task can be transmitted to the computing network element for computation.

For example, the session management network element sends the second computing task response to the terminal device to notify the terminal device that the computing task request has been accepted by the network.

It should be noted that the second computing task response includes information about an IP address allocated by the SMF/UPF for the target computing task, where this IP address is used as a source IP address of the data of the target computing task subsequently sent in the uplink by the terminal device.

For example, the process of step 205 may include the following step 205*a* and step 205*b*.

Step 205*a*: The session management network element sends the second computing task response to the mobility management network element. The second computing task response is used to notify the mobility management network element that computing session establishment is completed.

Step 205*b*: The mobility management network element sends the second computing task response to the terminal device. The second computing task response is used to notify the terminal device that the computing task request has been accepted by the network.

Optionally, in this embodiment of this application, the method for allocating a resource for a computing task according to this embodiment of this application further includes the following step 206.

Step 206: The session management network element sends a first computing task request to the computing power control network element based on the second computing task request.

The first computing task request is used to request the computing power control network element to allocate a computing power resource for the target computing task.

For example, the second computing task request carries the computing power QoS policy. Optionally, the second computing task request may further carry the associated computing session ID. The computing session ID may be generated by the terminal device and sent to the session management network element; or may be generated by the session management network element for the target computing task of the terminal device.

Optionally, in this embodiment of this application, the session management network element and the computing power control network element may exchange allocation status information to notify each other of respective resource allocation status information.

For example, after the process of step 202, the method for allocating a resource for a computing task according to this embodiment of this application further includes the following step 207.

Step 207: The session management network element sends allocation status information of the communication resource to the computing power control network element; and/or the session management network element receives allocation status information of the computing power resource from the computing power control network element.

It should be noted that for the allocation status information, reference may be made to the foregoing description. Details are not described herein again.

In the method for allocating a resource for a computing task according to this embodiment of this application, the session management network element can obtain the second computing task request, and allocate the communication resource for the target computing task of the terminal device based on the task information of the target computing task that is included in the second computing task request. It can be ensured that an operator network can allocate the corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

Figure 4:
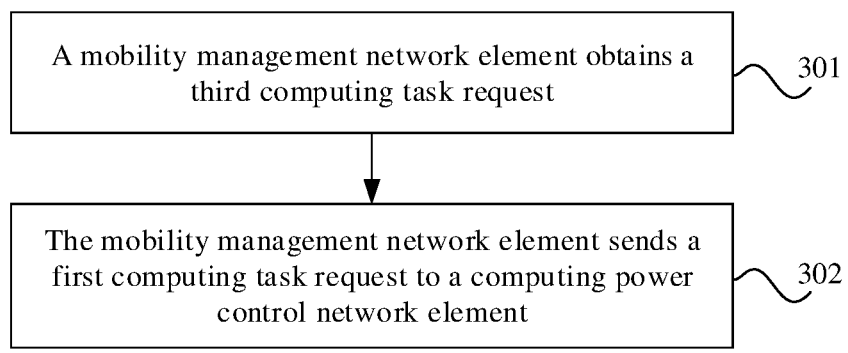
FIG. 4 is a third schematic flowchart of a method for allocating a resource for a computing task according to an embodiment of this application.

An embodiment of this application provides a method for allocating a resource for a computing task. The method is applied to a mobility management network element. As shown in FIG. 4, the method includes the following step 301 and step 302.

Step 301: A mobility management network element obtains a third computing task request.

The third computing task request includes task information of a target computing task of a terminal device.

Optionally, in this embodiment of this application, the task information includes at least one of the following: computing task identification information, packet data unit PDU session identification information corresponding to the computing task, a request type information corresponding to a PDU session, computing task description information, a DNN, or S-NSSAI, where the request type information corresponding to the PDU session is used to indicate that the PDU session is a session for transmitting data related to the computing task.

The computing task description information includes at least one of the following: a type of the computing task, a purpose of the computing task, a service requirement of the computing task, an IP address of the computing task, or port number information corresponding to the computing task.

Optionally, in this embodiment of this application, the third computing task request may be a request message initiated by the terminal device to the mobility management network element. The message is used to request the network to allocate a corresponding computing power resource for the computing task of the terminal device.

For example, the third computing task request includes at least one of the following information: the type of the computing task, the purpose, a computing session identifier, a PDU session ID, or the service requirement of the computing task (an error rate of the computing task and/or a delay of the computing task (that is, a computing success rate and an end-to-end roundtrip)). Optionally, the message may further include the DNN corresponding to the computing task, slice identification (such as the S-NSSAI) information, and a PDU session type, where the PDU session type is used to indicate that the PDU session is a session for transmitting the data related to the computing task.

For example, an implementation form of the third computing task request may be a computing session establishment request message, a computing power request message, or a PDU session establishment request. In other words, the foregoing message names may include the foregoing information element content.

Step 302: The mobility management network element sends a first computing task request to a computing power control network element, where
the first computing task request is used to request to allocate a computing power resource and/or a communication resource for the target computing task; and/or
the mobility management network element sends a second computing task request to a session management network element, where the second computing task request is used to request to allocate a communication resource and/or a computing power resource for the target computing task.

In a possible implementation, the mobility management network element may first send the second computing task request to the session management network element to request to allocate the communication resource for the target computing task, and then send the first computing task request to the computing power control network element to request the computing power control network element to allocate the corresponding computing power resource for the target computing task of the terminal device.

In another possible implementation, the mobility management network element may first send the first computing task request to the computing power control network element to request the computing power control network element to allocate the corresponding computing power resource for the target computing task of the terminal device, and then send the second computing task request to the session management network element to request to allocate the communication resource for the target computing task.

In still another possible implementation, the mobility management network element may send the first computing task request to the computing power control network element and the second computing task request to the session management network element separately.

Optionally, in this embodiment of this application, the method for allocating a resource for a computing task according to this embodiment of this application further includes the following step 303.

Step 303: The mobility management network element selects a target device based on the third computing task request.

The target device includes either of the following: the session management network element and the computing power control network element.

For example, the mobility management network element may select the session management network element based on the obtained third computing task request.

It should be noted that the method in this step is basically similar to an existing method of selecting a session management network element for a PDU session of a terminal device by a mobility management network element. The only difference lies in that the mobility management network element may consider a capability of the session management network element that supports the PDU session related to the computing task, and select the session management network element that supports the PDU session of the computing task.

For example, the mobility management network element may select the computing power control network element based on the obtained third computing task request.

For example, before the mobility management network element selects the computing power control network element, the mobility management network element needs to request subscription data of the terminal device from a unified data management (UDM) function or a unified data repository (UDR) function to verify whether the terminal device has subscription information related to the computing task, and if yes, the mobility management network element performs a subsequent procedure, including selecting the computing power control network element, or if no, the mobility management network element rejects the request of the terminal device.

It should be noted that the mobility management network element may select the session management network element and the computing power control network element in an arbitrary order based on the third computing task request message. This is not limited in this application.

Optionally, in this embodiment of this application, the process of step 303 may include the following step 303a.

Step 303a: The mobility management network element selects the target device based on first information included in the third computing task request.

The first information includes at least one of the following: an area of interest (AOI) (for example, a current location of the UE or designated area information provided by a server), subscription information corresponding to the target computing task of the terminal device, or the computing task description information.

For example, the first information may further include at least one of the following. For example, the mobility management network element may select the computing power control network element based on at least one of the following information:
a target area;

subscription information related to the target computing task of the terminal device;
the DNN;
the S-NSSAI; or
the computing task description information of the target computing task.

For example, the target area may be the AOL. Optionally, the AOI may include the current location of the terminal device or the designated area information provided by the server.

Referring to the foregoing consideration factors, the mobility management network element may determine to select an appropriate computing power control network element based on configuration information of the mobility management network element; or the mobility management network element may send the reference factors to an NRF to query the NRF for the corresponding matched computing power control network element.

Optionally, in this embodiment of this application, if the target device is the session management network element, the session management network element supports establishing a PDU session for the target computing task; or
  if the target device is the computing power control network element, the computing power control network element supports selecting a computing network element for the target computing task, and the computing network element is capable of providing the computing power resource corresponding to the target computing task.

Optionally, in this embodiment of this application, the method for allocating a resource for a computing task according to this embodiment of this application further includes the following step 304.

Step 304: The mobility management network element sends a third computing task response to the terminal device.

The third computing task response includes network element information of a computing network element corresponding to the computing power resource, and/or information about the communication resource (for example, a resource identifier corresponding to the communication resource).

For example, the third computing task response includes some or all information of communication QoS corresponding to the target computing task.

For example, the third computing task response may include at least one of the following information: an IP address corresponding to the computing network element selected by the computing power control network element for the computing task (that is, the target computing task) of the terminal device, or information about an IP address allocated by the session management network element or a UPF for the PDU session of the terminal device.

The IP address of the computing network element is used as a destination IP address of computing task data to be sent in an uplink by the terminal device, to ensure that the computing task data can be transmitted to the computing network element for computation; and the IP address of the terminal device is used as a source IP address of computing task data subsequently sent in the uplink by the terminal device.

For example, after obtaining the third computing task response, the mobility management network element may send a response message to the terminal device to notify the terminal device that the computing task request has been accepted by the network.

Optionally, in this embodiment of this application, the third computing task response further includes the computing task identification information, and/or the PDU session identification information corresponding to the associated computing task.

For example, the computing task identification information may include a terminal device ID and a session ID of a computing session. The PDU session identification information may include the corresponding PDU session ID. The S-NSSAI may be slice identification information corresponding to the computing task.

Optionally, in this embodiment of this application, the process of step 302 may include the following step 302a.

Step 302a: The mobility management network element sends a PDU session establishment request to the session management network element.

For example, the PDU session establishment request is used to request the session management network element to allocate the corresponding communication resource for the target computing task of the terminal device.

Optionally, in this embodiment of this application, the first computing task request is a request sent by the mobility management network element to the computing power control network element at a first moment, and the second computing task request is a request sent by the mobility management network element to the session management network element at a second moment, and the first moment is a moment after the second moment, or the first moment is a moment before the second moment.

In a possible implementation, the mobility management network element first sends a first computing task request to the computing power control network element, and receives a response for the first computing task request sent by the computing power control network element; and then the mobility management network element sends a second computing task request to the session management network element.

In another possible implementation, the mobility management network element first sends a second computing task request to the session management network element, receives a response sent by the session management network element for the second computing task request, and then sends a first computing task request to the computing power control network element.

It should be noted that the first computing task request and the second computing task request may be sent in an arbitrary order. This is not limited in this embodiment of this application.

In the method for allocating a resource for a computing task according to this embodiment of this application, the mobility management network element can obtain the third computing task request, request the computing power control network element to allocate the computing power resource for the target computing task based on the task information of the target computing task that is included in the third computing task request, and request the session management network element to allocate the communication resource for the target computing task. Therefore, it can be ensured that an operator network can allocate the corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

Figure 5:
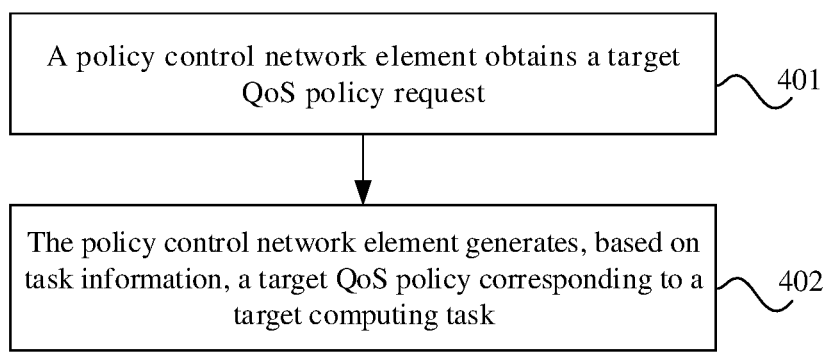
FIG. 5 is a fourth schematic flowchart of a method for allocating a resource for a computing task according to an embodiment of this application.

An embodiment of this application provides a method for allocating a resource for a computing task. The method is applied to a policy control network element. As shown in FIG. 5, the method includes the following step 401 and step 402.

Step 401: A policy control network element obtains a target QoS policy request.

Step 402: The policy control network element generates, based on task information, a target QoS policy corresponding to a target computing task.

The target QoS policy request is used to request the policy control network element to generate the target QoS policy corresponding to the target computing task, and the target QoS policy request includes the task information of the target computing task; and the target QoS policy includes at least one of the following: a computing power QoS policy or a communication QoS policy.

For example, the target QoS policy request may be a computing policy request message sent by a computing power control network element or a session management network element and used to request a dynamic policy applicable to a computing session. Optionally, the dynamic policy includes a computing policy and an SM policy. The computing policy includes the computing power QoS policy; and the SM policy includes the communication QoS policy.

For example, the policy control network element needs to ensure that a sum of a delay in the allocated communication QoS policy and a delay in the computing power QoS policy does not exceed a delay in a service requirement of the target computing task requested by a terminal device. In addition, the policy control network element needs to ensure that data transmission accuracy (which may be 1-PER) in the allocated communication QoS policy multiplied by computation accuracy in the computing power QoS policy is not lower than accuracy in the service requirement of the target computing task requested by the terminal device.

Optionally, in this embodiment of this application, the target QoS policy request includes a communication QoS policy request and/or a computing power QoS policy request. The communication QoS policy request is used to request the policy control network element to generate the communication QoS policy corresponding to the target computing task, and the computing power QoS policy request is used to request the policy control network element to generate the computing power QoS policy corresponding to the target computing task.

Optionally, in this embodiment of this application, the task information includes at least one of the following: computing task identification information, a PDU session identifier corresponding to the computing task, computing task description information, a DNN, or S-NSSAI. The computing task description information includes at least one of the following: a type of the computing task, a purpose of the computing task, the service requirement of the computing task, an IP address of the computing task, or port number information corresponding to the computing task.

Optionally, in this embodiment of this application, the policy control network element may generate, based on the communication QoS policy request, the communication QoS policy corresponding to the target computing task, and the policy control network element may generate, based on the computing power QoS policy request, the computing power QoS policy corresponding to the target computing task.

Optionally, in this embodiment of this application, the policy control network element needs to ensure that the sum of the delay in the allocated communication QoS policy and the delay in the computing power QoS policy does not exceed the delay in the service requirement of the target computing task requested by the terminal device. In addition, the policy control network element needs to ensure that the data transmission accuracy (which may be 1-PER) in the allocated communication QoS policy multiplied by the computation accuracy in the computing power QoS policy is not lower than the accuracy in the service requirement of the target computing task requested by the terminal device.

Optionally, in this embodiment of this application, step 401 may include the following step 401a.

Step 401a: The policy control network element obtains the target QoS policy request from the session management network element; or the policy control network element obtains the target QoS policy request from the computing power control network element.

For example, the policy control network element may obtain the target QoS policy request from either of the session management network element and the computing power control network element; or may obtain the target QoS policy request from the session management network element and the computing power control network element separately.

Optionally, in this embodiment of this application, step 402 may include the following step 402a.

Step 402a: The policy control network element generates the target QoS policy based on the service requirement of the target computing task.

Optionally, in this embodiment of this application, the process of step 402 may include the following step 402b.

Step 402b: The policy control network element generates a delay policy in the target QoS policy based on a delay requirement in the service requirement of the target computing task; and/or the policy control network element generates a computation accuracy policy in the target QoS policy based on a computation accuracy requirement in the service requirement of the target computing task.

Optionally, in this embodiment of this application, the method for allocating a resource for a computing task according to this embodiment of this application further includes the following step 404.

Step 404: The policy control network element sends the target QoS policy to the session management network element; and/or the policy control network element sends the target QoS policy to the computing power control network element.

For example, the policy control network element may send the target QoS policy to the session management network element and the computing power control network element separately, or send the target QoS policy to one of the session management network element and the computing power control network element.

In the method for allocating a resource for a computing task according to this embodiment of this application, the policy control network element can obtain the target QoS policy request, and generate, based on the task information of the target computing task that is included in the target QoS policy request, the target QoS policy corresponding to the target computing task, where the target QoS policy includes at least one of the following: the computing power QoS policy or the communication QoS policy. Therefore, it can be ensured that an operator network can allocate a corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

Figure 6:
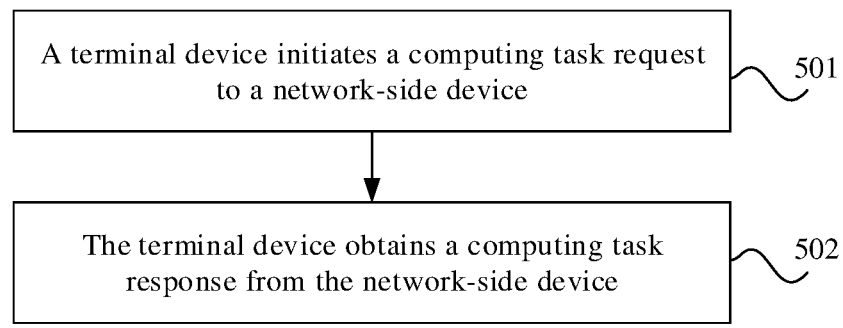
FIG. 6 is a fifth schematic flowchart of a method for allocating a resource for a computing task according to an embodiment of this application.

An embodiment of this application provides a method for allocating a resource for a computing task. The method is applied to a terminal device. As shown in FIG. 6, the method includes the following step 501 and step 502.

Step 501: A terminal device initiates a computing task request to a network-side device.

The computing task request is used to request to allocate a communication resource and/or a computing power resource for a target computing task of the terminal device, and the computing task request includes task information of the target computing task. For example, the computing task request may be a third computing task request received by a mobility management network element.

Optionally, in this embodiment of this application, the task information includes at least one of the following: computing task identification information, packet data unit PDU session identification information corresponding to the computing task, request type information corresponding to a PDU session, computing task description information, a DNN, or S-NSSAI. The computing task description information includes at least one of the following: a type of the computing task, a purpose of the computing task, a service requirement of the computing task, an IP address of the computing task, or port number information corresponding to the computing task.

Step 502: The terminal device obtains a computing task response from the network-side device.

The computing task response includes network element information of a computing network element corresponding to the computing power resource allocated for the target computing task, and/or information about the communication resource allocated for the target computing task.

It should be noted that for the network element information and the information about the communication resource, reference may be made to the foregoing description. Details are not described herein again.

Optionally, in this embodiment of this application, the process of step 501 may include the following step 501a.

Step 501a: The terminal device initiates the computing task request to a target device.

The target device includes at least one of the following: the mobility management network element, a session management network element, or a computing power control network element.

For example, the computing task request includes at least one of the following information: the type of the computing task, the purpose, a computing session identifier, a PDU session ID, or the service requirement of the computing task (an error rate of the computing task and/or a delay of the computing task). Optionally, the request message may further include the DNN corresponding to the computing task, slice identification (such as the S-NSSAI) information, and a PDU session type, where the PDU session type is used to indicate that the PDU session is a session for transmitting data related to the computing task.

For example, an implementation form of the request message may be a computing session establishment request message, a computing power request message, or a PDU session establishment request. In other words, the foregoing message names may include the foregoing information element content.

Optionally, in this embodiment of this application, in a case that the target device is the session management network element, the computing task request is a PDU session establishment request.

For example, the terminal device may send the computing task request to the session management network element to request the communication resource corresponding to the target computing task.

In the method for allocating a resource for a computing task according to this embodiment of this application, the terminal device can initiate the computing task request (including the task information of the target computing task) to the network-side device to request to allocate the communication resource and/or the computing power resource for the target computing task, and obtain the computing task response from the network-side device, where the computing task response includes the network element information of the computing network element corresponding to the computing power resource allocated for the target computing task of the terminal device, and/or the information about the communication resource allocated for the target computing task of the terminal device. Therefore, it can be ensured that an operator network can allocate the corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

It should be noted that in the technical solutions provided in the embodiments of this application, the modification procedure of the associated PDU session is triggered mainly by triggering allocation of the computing power resource. Certainly, the network side may trigger the modification of the PDU session (for example, trigger the modification of the PDU session when the communication QoS is already satisfied) or not trigger the modification of the PDU session (for example, trigger establishment of a new dedicated QoS flow when the communication QoS is not satisfied). In one example, if the existing PDU session can already meet the data transmission requirement of the computing task, the PDU session modification procedure does not need to be triggered, that is, the session management network element does not need to initiate a corresponding operation.

The technical solutions provided in the embodiments of this application are hereinafter described by using several examples.

For illustrative purposes in the following examples, a server is an AF, a policy control network element is a PCF, a mobility management network element is an AMF, a session management network element is an SMF, and a terminal device is UE. It should be noted that the network element names in the following examples are merely examples. In an actual application, other network element names may also be used. This is not limited in the embodiments of this application.

Embodiment 1

Figure 7:
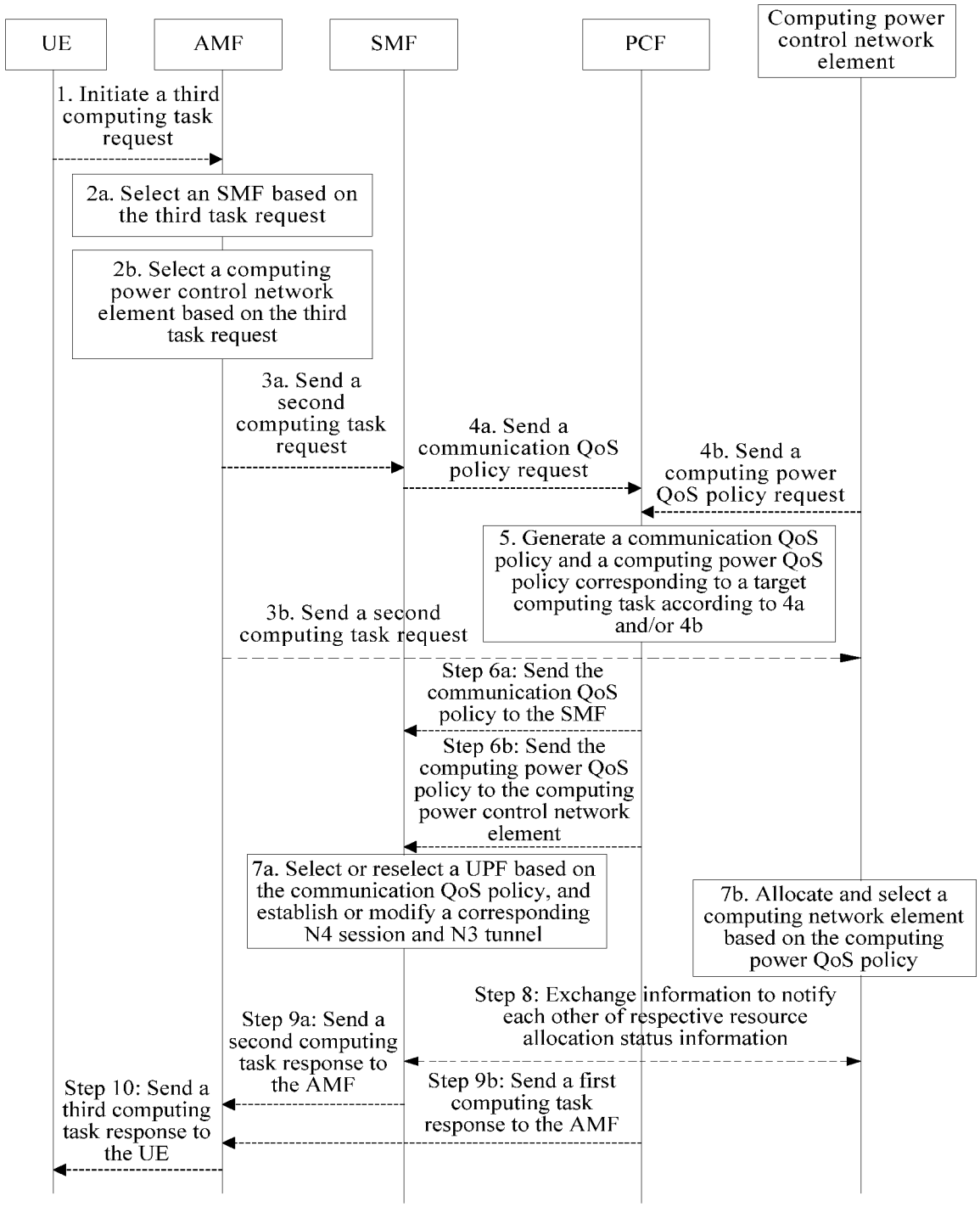
FIG. 7 is a sixth schematic flowchart of a method for allocating a resource for a computing task according to an embodiment of this application.

For example, as shown in FIG. 7, the technical solution provided in this embodiment can be implemented through the following steps.

Step 1: UE initiates a third computing task request to a network AMF, where the request is used to request the network to allocate a corresponding computing power resource for a computing task of the UE.

For example, the third computing task request includes at least one of the following information: a type of the computing task, a purpose of the computing task, computing session identification information, a PDU session ID, or a service requirement of the computing task (including an accuracy requirement of the target computing task and/or a delay requirement of the target computing task). Optionally, the third computing task request may further include a DNN corresponding to the computing task, slice identification (such as S-NSSAI) information, and request type information corresponding to a PDU session, where the PDU session type is used to indicate that the PDU session is a session for transmitting data related to the target computing task.

For example, an implementation form of the third computing task request may be a computing session establishment request message, a computing power request message, or a PDU session establishment request. In other words, the foregoing message names may include the foregoing information element content.

Optionally, after step 1, this embodiment may further include step 2a and/or step 2b.

Step 2a: The AMF selects an SMF based on the third computing task request sent by the UE.

It should be noted that an implementation of step 2a is basically similar to a method of selecting an SMF for a PDU session of UE by an AMF in the communications technologies. The only difference lies in that the AMF may consider a capability of the SMF that supports the PDU session related to the computing task and select the SMF that supports the PDU session of the computing task.

Step 2b: The AMF selects a computing power control network element based on the third computing task request sent by the UE.

Optionally, after step 2, this embodiment may further include step 3a and/or step 3b.

Step 3a: The AMF sends a second computing task request to the SMF.

For example, the second computing task request may be a PDU session establishment request message.

It should be noted that this step is similar to the communications technologies in which an AMF forwards a PDU session establishment request initiated by UE to an SMF. The only difference lies in that if the UE sends a computing session establishment request message or a computing power request message instead of a PDU session establishment request, herein the AMF needs to filter out PDU session information (such as the PDU session ID), and trigger a PDU session establishment request by itself, where the request may include the PDU session ID and a UE ID.

Step 3b: The AMF sends a first computing task request to the computing power control network element to request the computing power control network element to allocate the corresponding computing power resource for the target computing task of the UE.

For example, the first computing task request includes the UE ID and a session ID of a computing session. Optionally, the first computing task request may further include at least one of the following information: the associated PDU session ID, description information of the computing task, the DNN, the slice identification information, or the like.

Optionally, if the network is deployed with a dynamic PCC architecture, that is, if a PCF allocates a dynamic PCC policy, after step 3, this embodiment may further include step 4a and/or step 4b.

Step 4a: The SMF sends a communication QoS policy request to the PCF to request a communication QoS policy applicable to the PDU session.

Step 4b: The computing power control network element sends a computing power QoS policy request to the PCF to request a computing power QoS policy applicable to the computing session.

Step 5: The PCF generates the communication QoS policy and the computing power QoS policy corresponding to the target computing task according to step 4a and/or step 4b.

For example, the PCF needs to ensure that a sum of a delay in the allocated communication QoS policy and a delay in the computing power QoS policy does not exceed a delay in the service requirement of the target computing task requested by the UE.

For example, the PCF needs to ensure that data transmission accuracy (which may be 1-PER) in the allocated communication QoS policy multiplied by computation accuracy in the computing power QoS policy is not lower than accuracy in the service requirement of the target computing task requested by the UE.

Optionally, after step 5, this embodiment may further include the following step 6a and/or step 6b.

Step 6a: The PCF feeds back the communication QoS policy to the SMF.

Step 6b: The PCF feeds back the computing power QoS policy to the computing power control network element.

Optionally, with reference to step 6a and step 6b, this embodiment may further include the following step 7a and step 7b.

Step 7a: The SMF selects or reselects a UPF based on the communication QoS policy, and establishes or modifies a corresponding N4 session and N3 tunnel.

Step 7b: The computing power control network element allocates and selects a computing network element based on the computing power QoS policy.

Optionally, this embodiment may further include the following step 8.

Step 8: The SMF and the computing power control network element exchange information to notify each other of respective resource allocation status information.

It should be noted that the foregoing example assumes that the SMF notifies the computing power control network element of the UPF selected by the SMF and corresponding information. Conversely, a method for notifying, by the computing power control network element, the SMF of the computing network element selected by the computing power control network element is also similar.

Optionally, after step 8, this embodiment may further include the following step 9a and step 9b.

Step 9a: The SMF sends a second computing task response to the AMF to notify the AMF that the PDU session establishment is completed.

For example, the second computing task response may be a PDU session establishment response message.

For example, the PDU session establishment response message includes IP address information allocated by the SMF/UPF for the PDU session of the UE. An IP address of the UE is used as a source IP address of computing task data of the target computing task subsequently sent in an uplink by the UE.

Step 9b: The computing power control network element sends a first computing task response to the AMF to notify the AMF that computing session establishment is completed.

For example, the first computing task response may be a computing session establishment response. Optionally, the computing session establishment response message includes an IP address corresponding to the computing network element selected by the computing power control network element for the target computing task of the UE. The IP address of the computing network element is used as a destination IP address of the data of the target computing task to be sent in the uplink by the UE, to ensure that the data of the target computing task can be transmitted to the computing network element for computation.

Optionally, after step 9a and step 9b, this embodiment may further include the following step 10.

Step 10: The AMF sends a third computing task response to the UE, to notify the UE that the target computing task request has been accepted by the network.

In one implementation, the third computing task response includes the two IP addresses in steps 9a and 9b (that is, the IP address corresponding to the computing network element and the IP address information allocated for the PDU session).

It should be noted that the newly introduced computing power control function network element is used as a logical function and can be implemented as an independently deployed entity or a sub-functional module on the SMF. If the newly introduced computing power control function network element is integrated with the SMF, steps 3a and 3b may be combined into one step. Likewise, steps 4a and 4b, steps 6a and 6b, and steps 9a and 9b may be combined respectively. Step 8 may be omitted.

Embodiment 2

If dynamic PCC is not deployed, the following alternative embodiment may exist.

For example, in this embodiment, actions of interaction with the PCF in the foregoing steps 4 to 6 may be omitted and replaced by internal execution actions of the computing power control network element or the session management network element in the following two implementations. The other steps are basically not changed.

For example, a computing power QoS policy is determined by the computing power control network element based on an internal configuration policy and sent to the SMF through information exchange between the SMF and the computing power control network element. The SMF then obtains communication QoS through computation based on the internal configuration policy and computing power QoS.

For example, communication QoS is determined by the SMF based on an internal configuration policy and sent to the computing power control network element through information exchange between the SMF and the computing power control network element. The computing power control network element then obtains computing power QoS through computation based on the internal configuration policy and communication QoS.

For details about the remaining steps, refer to Embodiment 1. Details are not described herein again.

Embodiment 3

Figure 8:
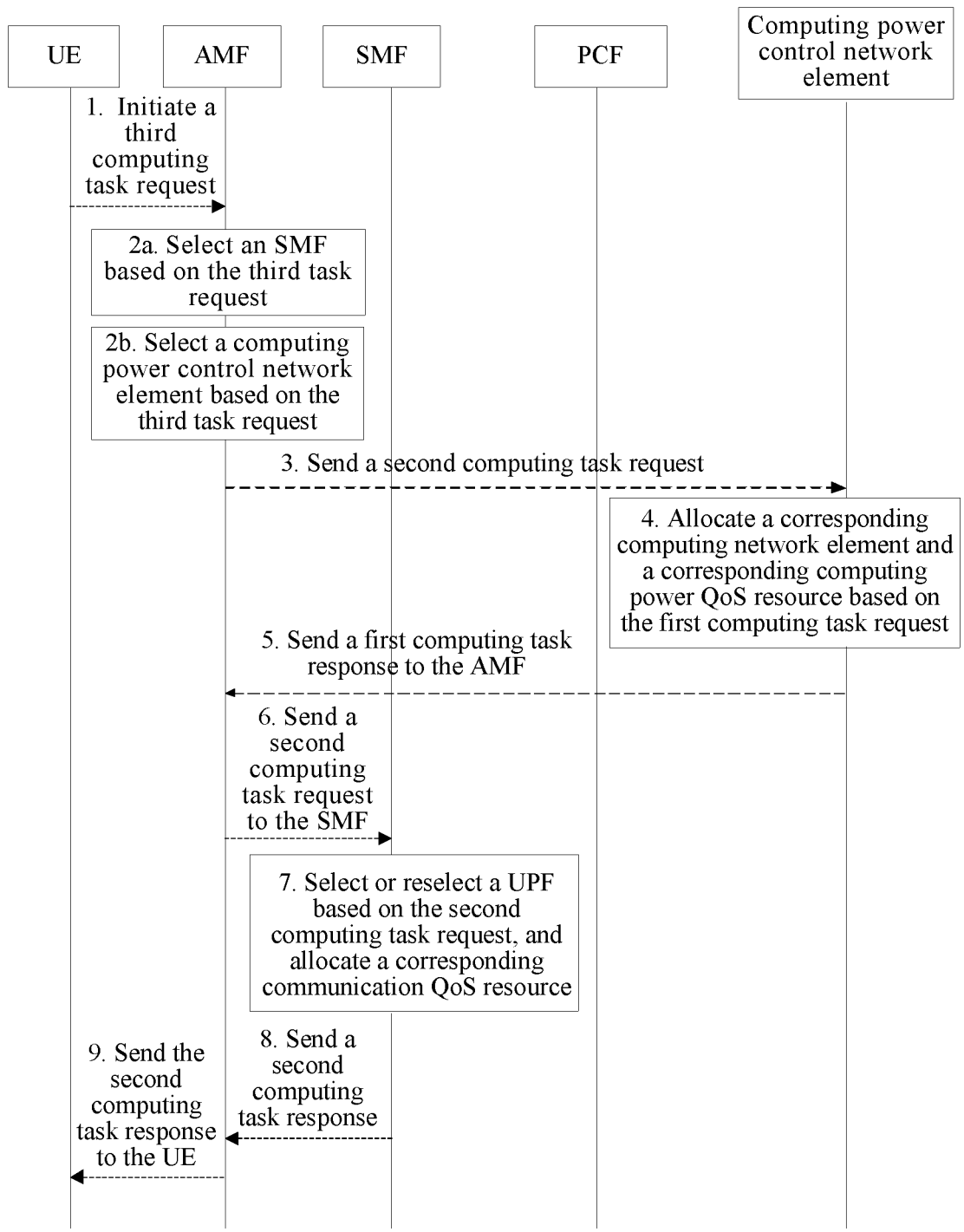
FIG. 8 is a seventh schematic flowchart of a method for allocating a resource for a computing task according to an embodiment of this application.

With reference to Embodiment 1, as shown in FIG. 8, the technical solution provided in this embodiment can be implemented through the following steps.

Step 1 is the same as step 1 in Embodiment 1.
Step 2a is the same as step 2a in Embodiment 1.
Step 2b is the same as step 2b in Embodiment 1.
Step 3 is the same as step 3b in Embodiment 1.

Step 4: The computing power control network element allocates a corresponding computing network element and a corresponding computing power QoS resource based on the first computing task request in step 3.

For example, as shown in step 4a and step 4b, if the network is deployed with a dynamic PCC architecture, the computing power control network element requests a computing power QoS policy from the PCF, where the first computing task request includes information related to the target computing task and is used to request the PCF to allocate an appropriate computing policy (including the computing power QoS policy; refer to step 4b in Embodiment 1) for the target computing task. In this implementation, the computing power control network element selects a computing network element with reference to the computing power QoS policy to ensure that a computation delay in completing the corresponding target computing task by the computing network element is not higher than a delay requirement in the computing power QoS policy, and/or ensure that accuracy of completing the target computing task by the computing network element is not lower than a computation accuracy requirement in the computing power QoS policy.

Step 5: Same as in step 9b in Embodiment 1, the computing power control network element sends a first computing task response to the AMF.

For example, the first computing task response includes an allocated IP address of the computing network element and computing power QoS information allocated by the computing power control network element for the target computing task of the UE (for details, refer to the foregoing description).

Step 6: After receiving the first computing task response, the AMF sends a second computing task request to the SMF.

For example, same as in Embodiment 1, the second computing task request may be a PDU session establishment request message, and the second computing task request includes a PDU session ID and a UE ID.

For example, the second computing task request includes computing network element information (an IP address, identification information, an FQDN, and the like) allocated by the computing power control network element.

For example, the second computing task request includes the computing power QoS policy allocated by the computing power control network element.

Step 7: The SMF selects or reselects a UPF based on the second computing task request, and allocates a corresponding communication QoS resource.

For example, the SMF computes a communication QoS policy based on a task requirement of the target computing task in the second computing task request and the computing power QoS policy allocated by the computing power control network element and sent by the AMF in step 6. It should be noted that other QoS indicators can be implemented with reference to the communications technologies. For example, among communication QoS indicators generated by the SMF, some need to be sent to the UE as a QoS policy, some need to be sent to an RAN as a QoS profile, and some need to be sent to the UPF as QoS enforcement for execution.

For example, the SMF itself computes the communication QoS policy. Alternatively, the SMF transmits the task requirement of the target computing task and the computing power QoS policy to the PCF, and the PCF determines a finally allocated communication QoS policy based on the two and then sends the communication QoS policy to the SMF to generate finally executed communication QoS information (including the communication QoS policy to be sent to the UE, the QoS profile to be sent to the RAN, and the QoS enforcement to be sent to the UPF) based on the communication QoS policy.

Step 8: The SMF sends a second computing task response to the AMF.

Refer to step 9*a* in Embodiment 1.

Step 9: The AMF sends the second computing task response to the UE.

It should be noted that in another embodiment, the AMF may first send the second computing task request to the SMF, the SMF sends the second computing task response to the AMF, and then the AMF sends the first computing task request to the computing power control network element.

Embodiment 4

Figure 9:
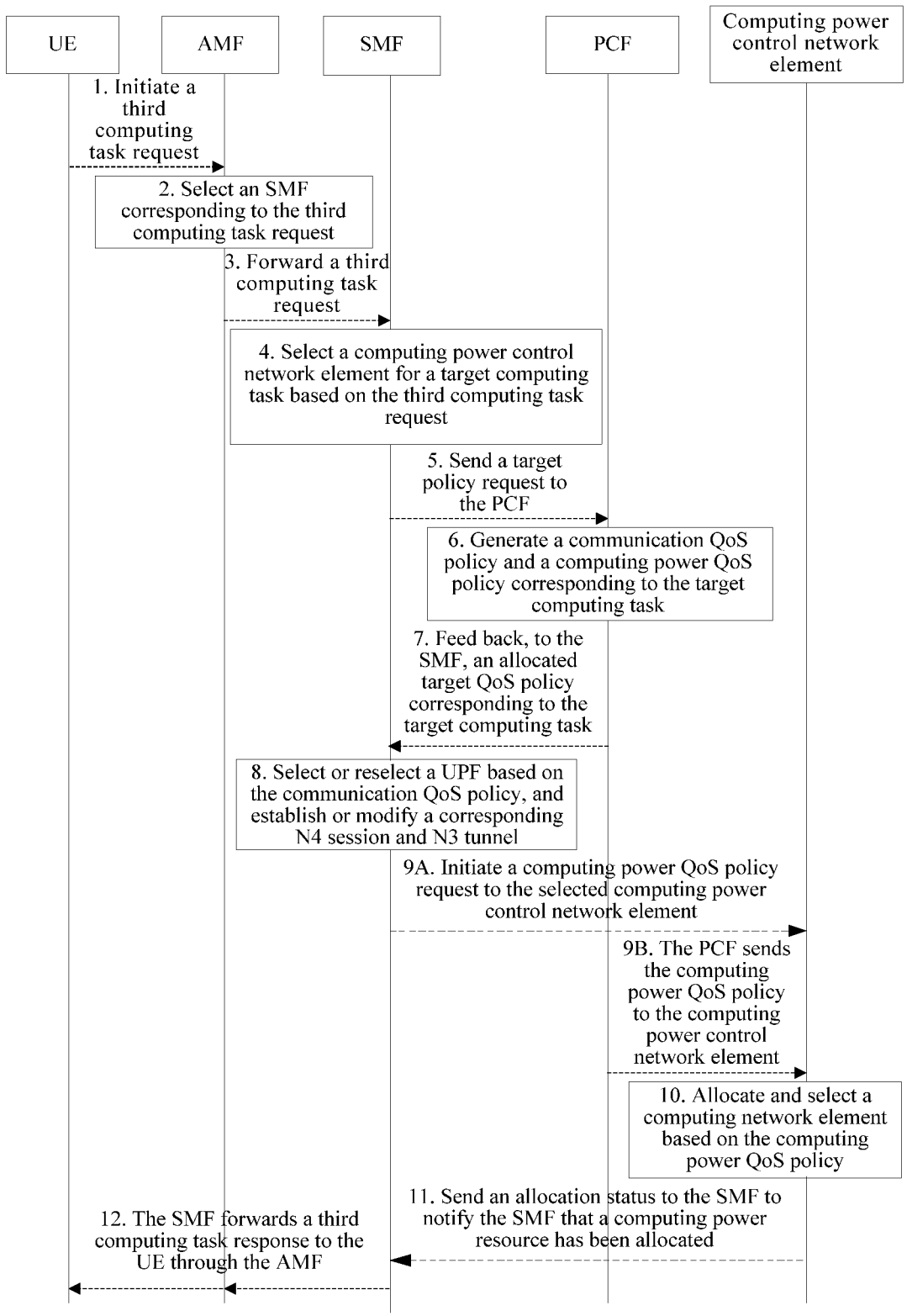
FIG. 9 is an eighth schematic flowchart of a method for allocating a resource for a computing task according to an embodiment of this application.

With reference to Embodiment 1, as shown in FIG. 9, the technical solution provided in this embodiment can be implemented through the following steps.

Step 1: UE sends a third computing task request to an AMF.

It should be noted that, for details about this step, reference may be made to step 1 in Embodiment 1.

Optionally, the second computing task request includes task information of a target computing task.

Step 2: The AMF selects an SMF corresponding to the third computing task request.

It should be noted that, for details about this step, reference is made to step 2 in Embodiment 1.

Step 3: The AMF forwards the third computing task request to the SMF.

It should be noted that, for details about this step, reference is made to Embodiment 1.

Step 4: Optionally, the SMF selects a computing power control network element for the target computing task based on the third computing task request.

For example, the SMF selects the computing power control network element for the target computing task based on the task information of the target computing task that is included in the third computing task request.

Optionally, in a scenario in which a network is deployed with a dynamic PCC architecture, this embodiment further includes the following steps: The SMF interacts with a PCF to perform steps 5 to 7. Otherwise, steps 5 to 7 are completed in the SMF.

Step 5: The SMF sends a target policy request to the PCF to request a target QoS policy applicable to the entire target computing task.

Step 6: The PCF generates a communication QoS policy and a computing power QoS policy corresponding to the target computing task.

For details, refer to step 5 in Embodiment 1.

Step 7: The PCF feeds back, to the SMF, an allocated target QoS policy corresponding to the target computing task.

Step 8: The SMF selects or reselects a UPF based on the communication QoS policy, and establishes or modifies a corresponding N4 session and N3 tunnel.

For details, refer to step 7*a* in Embodiment 1.

Step 9A: The SMF initiates a computing power QoS policy request to the selected computing power control network element.

For example, the computing power QoS policy request carries the computing power QoS policy generated by the PCF in step 6.

For example, the computing power QoS policy request may further carry computing session ID information. The computing session ID information may be generated by the UE and sent to the SMF through steps 1 and 3; or may be generated by the SMF itself for the target computing task of the UE.

In another implementation, step 9A may be replaced with the following step 9B.

Step 9B: The PCF sends the computing power QoS policy to the computing power control network element.

For example, before this, the PCF may address, by using an identifier or address information of the computing power control network element that is carried in step 5, the computing power control network element that sends the computing power QoS policy, or the PCF itself initiates a network element query to an NRF based on the task information of the target computing task to discover an appropriate computing power control network element, and then sends the computing power QoS policy that is generated by the PCF for the target computing task to the computing power control network element.

Step 10: The computing power control network element allocates and selects a computing network element based on the computing power QoS policy.

Refer to step 7*b* in Embodiment 1.

Step 11: The computing power control network element sends allocation status information to the SMF to notify the SMF that a computing power resource has been allocated.

For example, the allocation status information includes an IP address or identification information of the allocated computing network element.

Step 12: The SMF sends a third computing task response to the UE through the AMF to notify the UE that the PDU session establishment is completed.

For example, the third computing task response includes the IP address allocated by the SMF/UPF for the PDU session of the UE (used as a source address of data related to the target computing task to be subsequently sent by the UE) and the IP address or identification information of the computing network element (used as a destination address of the data related to the target computing task to be sent by the UE).

Embodiment 5

With reference to Embodiment 1, the technical solution provided in this embodiment can be implemented through the following steps.

Step 1: UE sends a third computing task request to an AMF.

It should be noted that, for details about this step, reference may be made to step 1 in Embodiment 1.

Optionally, the third computing task request includes task information of a target computing task.

Step 2: The AMF selects a computing power control network element corresponding to the third computing task request.

Step 3: The AMF sends the third computing task request to the computing power control network element.

Step 4: The computing power control network element selects an SMF for the target computing task based on the third computing task request.

For example, the computing power control network element selects the SMF for the target computing task based on the task information of the target computing task that is included in the third computing task request.

Step 5: The computing power control network element sends a target policy request to a PCF to request a target QoS policy applicable to the entire target computing task.

Step 6: The PCF generates a communication QoS policy and a computing power QoS policy corresponding to the target computing task.

For details, refer to step 5 in Embodiment 1.

Step 7: The PCF feeds back, to the computing power control network element, the allocated target QoS policy corresponding to the target computing task.

Step 8: The computing power control network element allocates and selects a computing network element based on the computing power QoS policy.

Step 9a: The computing power control network element initiates a communication QoS policy request to the selected SMF.

For example, the communication QoS policy request carries the communication QoS policy generated by the PCF.

For example, the communication QoS policy request may further carry computing session ID information.

In another implementation, step 9a may be replaced with the following step 9b.

Step 9b: The PCF sends the communication QoS policy to the SMF.

Step 10: The SMF selects or reselects a UPF based on the communication QoS policy, and establishes or modifies a corresponding N4 session and N3 tunnel.

Step 11: The SMF sends allocation status information to the computing power control network element to notify the computing power control network element that communication resource allocation is completed.

For example, the allocation status information includes a resource identifier corresponding to the allocated communication resource.

Step 12: The computing power control network element sends a third computing task response to the UE through the AMF to notify the UE that the communication resource allocation is completed.

In the method for allocating a resource for a computing task according to the embodiments of this application, it can be ensured that an operator network can allocate the corresponding computing power resource and/or corresponding communication resource for the target computing task of the terminal device. Therefore, data related to the target computing task of the terminal device can be transmitted to the computing power resource, computation is performed on the computing power resource instead, and then a computation result is fed back. In this way, an ordinary terminal device can complete a target computing task without having a strong computing capability, thereby reducing costs, power consumption, and the like of the terminal device.

It should be noted that the method for allocating a resource for a computing task according to the embodiments of this application may be performed by an apparatus for allocating a resource for a computing task, or a control module configured to perform the method for allocating a resource for a computing task in the apparatus for allocating a resource for a computing task. An apparatus for allocating a resource for a computing task according to an embodiment of this application is described by assuming that the method for allocating a resource for a computing task in the embodiments of this application is performed by the apparatus for allocating a resource for a computing task.

Figure 10:
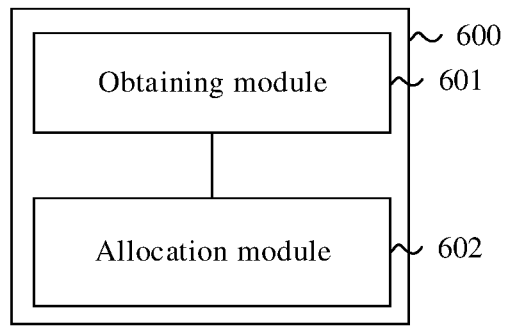
FIG. 10 is a first schematic diagram of a structure of an apparatus for allocating a resource for a computing task according to an embodiment of this application.

An embodiment of this application provides an apparatus 600 for allocating a resource for a computing task. As shown in FIG. 10, the apparatus 600 includes an obtaining module 601 and an allocation module 602.

The obtaining module 601 is configured to obtain a first computing task request, where the first computing task request is used to request to allocate a computing power resource for a target computing task of a terminal device, and the first computing task request includes task information of the target computing task. The allocation module 602 is configured to allocate the computing power resource for the target computing task based on the task information.

Optionally, in this embodiment of this application, the allocation module 602 is configured to select a computing network element based on the task information, where the computing network element is capable of providing the computing power resource corresponding to the target computing task.

Optionally, in this embodiment of this application, the computing power resource includes at least one of the following: a computing resource or a storage resource.

Optionally, in this embodiment of this application, the task information includes at least one of the following: computing task identification information, packet data unit PDU session identification information corresponding to the computing task, computing task description information, a DNN, or S-NSSAI, where the computing task description information includes at least one of the following: a type of the computing task, a purpose of the computing task, a service requirement of the computing task, an IP address of the computing task, or port number information corresponding to the computing task.

Optionally, in this embodiment of this application, the obtaining module 601 is further configured to obtain a computing power QoS policy corresponding to the target computing task.

Optionally, in this embodiment of this application, the allocation module 602 is configured to allocate the computing power resource for the target computing task based on the task information and the computing power QoS policy.

Optionally, in this embodiment of this application, the apparatus further includes a sending module 603, where the sending module 603 is configured to send a computing power QoS policy request to a policy control network element, where the computing power QoS policy request is used to request the computing power QoS policy corresponding to the target computing task; and the obtaining module is configured to obtain the computing power QoS policy from the policy control network element.

Optionally, in this embodiment of this application, the sending module 603 is configured to send the computing power QoS policy request to the policy control network element through a session management network element; and the obtaining module 601 is configured to obtain the computing power QoS policy from the policy control network element through the session management network element.

Optionally, in this embodiment of this application, the obtaining module 601 is configured to determine, based on a service requirement of the computing task included in the task information of the target computing task, the computing power QoS policy corresponding to the target computing task.

Optionally, in this embodiment of this application, the obtaining module 601 is configured to obtain the first computing task request from a first device, where the first device includes any one of the following: a mobility management network element, a session management network element, and an access network device.

Optionally, in this embodiment of this application, the sending module 603 is further configured to send a first computing task response to the terminal device, where the first computing task response includes network element information of a computing network element corresponding to the computing power resource, and the network element information includes network element identification information or network element address information.

Optionally, in this embodiment of this application, the first computing task response further includes associated PDU session identification information.

Optionally, in this embodiment of this application, the sending module 603 is configured to send the first computing task response to the terminal device through a first device, where the first device includes any one of the following: a mobility management network element, a session management network element, and an access network device.

Optionally, in this embodiment of this application, the sending module 603 is further configured to send allocation status information of the computing power resource to a session management network element; or receive allocation status information of a communication resource from a session management network element.

Optionally, in this embodiment of this application, the service requirement of the computing task includes at least one of the following: a delay requirement of the computing task or an accuracy requirement of the computing task.

Optionally, in this embodiment of this application, computing power QoS corresponding to the computing power QoS policy includes at least one of the following: computing power, a sample data volume, storage, a computation delay, computation accuracy, or a computation speed.

In the apparatus for allocating a resource for a computing task according to this embodiment of this application, the apparatus can obtain the first computing task request, and allocate the computing power resource for the target computing task of the terminal device based on the task information of the target computing task of the terminal device that is included in the first computing task request. In this way, an ordinary terminal device can complete a computing task without having a strong computing capability, thereby reducing costs, power consumption, and the like of the terminal device.

Figure 11:
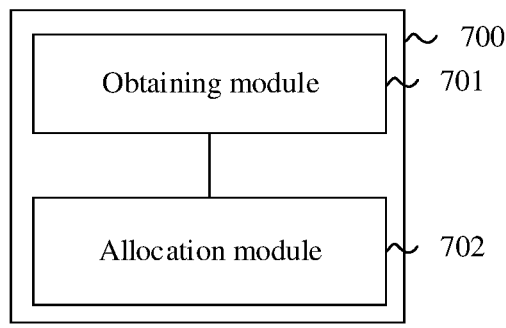
FIG. 11 is a second schematic diagram of a structure of an apparatus for allocating a resource for a computing task according to an embodiment of this application.

An embodiment of this application provides an apparatus 700 for allocating a resource for a computing task. As shown in FIG. 11, the apparatus 700 includes an obtaining module 701 and an allocation module 702.

The obtaining module 701 is configured to obtain a second computing task request, where the second computing task request is used to request to allocate a communication resource for a target computing task of a terminal device, and the second computing task request includes task information of the target computing task. The allocation module 702 is configured to allocate the communication resource for the target computing task based on the task information.

Optionally, in this embodiment of this application, the allocation module 702 is configured to establish a tunnel in a packet data unit PDU session for the terminal device based on the task information, where the tunnel in the PDU session is used to transmit data of the target computing task.

Optionally, in this embodiment of this application, the task information includes at least one of the following: computing task identification information, packet data unit PDU session identification information corresponding to the computing task, computing task description information, a DNN, or S-NSSAI, where the computing task description information includes at least one of the following: a type of the computing task, a purpose of the computing task, a service requirement of the computing task, or an IP address of the computing task.

Optionally, in this embodiment of this application, the obtaining module 701 is further configured to obtain a communication QoS policy of the target computing task.

Optionally, in this embodiment of this application, the allocation module 702 is further configured to allocate the communication resource for the target computing task based on the task information and the communication QoS policy of the target computing task.

Optionally, in this embodiment of this application, the apparatus further includes a sending module 703, where the sending module 703 is configured to send a communication QoS policy request to a policy control network element, where the communication QoS policy request is used to request the policy control network element to generate the communication QoS policy corresponding to the target computing task; and the obtaining module 701 is configured to obtain the communication QoS policy from the policy control network element.

Optionally, in this embodiment of this application, the apparatus further includes a receiving module 704, where the receiving module is configured to receive a computing power QoS policy request from a computing power control network element, where the computing power QoS policy request is used to request a computing power QoS policy corresponding to the target computing task; the sending module 703 is further configured to send the computing power QoS policy request to a policy control network element; the obtaining module is further configured to obtain the computing power QoS policy from the policy control network element; and the sending module 703 is further configured to send the computing power QoS policy to the computing power control network element.

Optionally, in this embodiment of this application, the task information includes a service requirement of the target computing task; and the obtaining module 701 is configured to determine, based on the service requirement of the target computing task, the communication QoS policy corresponding to the target computing task.

Optionally, in this embodiment of this application, the obtaining module 701 is configured to determine, based on the service requirement of the target computing task and a computing power QoS policy corresponding to the target computing task, the communication QoS policy corresponding to the target computing task.

Optionally, in this embodiment of this application, the obtaining module 701 is configured to obtain the second computing task request from a mobility management network element, where the second computing task request includes a packet data unit PDU session establishment request.

Optionally, in this embodiment of this application, the sending module 703 is further configured to send a second computing task response to the terminal device, where the second computing task response includes some or all information of communication QoS corresponding to the target computing task.

Optionally, in this embodiment of this application, the sending module 703 is further configured to send a first computing task request to a computing power control network element based on the second computing task request, where the first computing task request is used to request the computing power control network element to allocate a computing power resource for the target computing task.

Optionally, in this embodiment of this application, the sending module 703 is further configured to send an allocation status of the communication resource to a computing power control network element; or the receiving module 704 is further configured to receive an allocation status of a computing power resource from a computing power control network element.

In the apparatus for allocating a resource for a computing task according to this embodiment of this application, the apparatus can obtain the second computing task request, and allocate the communication resource for the target computing task of the terminal device based on the task information of the target computing task that is included in the second computing task request. It can be ensured that an operator network can allocate the corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

Figure 12:
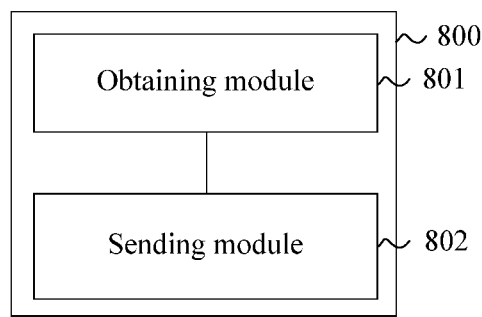
FIG. 12 is a third schematic diagram of a structure of an apparatus for allocating a resource for a computing task according to an embodiment of this application.

An embodiment of this application provides an apparatus 800 for allocating a resource for a computing task. As shown in FIG. 12, the apparatus 800 includes an obtaining module 801 and a sending module 802.

The obtaining module 801 is configured to obtain a third computing task request, where the third computing task request includes task information of a target computing task of a terminal device. The sending module 802 is configured to send a first computing task request to a computing power control network element, where the first computing task request is used to request to allocate a computing power resource and/or a communication resource for the target computing task; and/or send a second computing task request to a session management network element, where the second computing task request is used to request to allocate a communication resource and/or a computing power resource for the target computing task.

Optionally, in this embodiment of this application, the task information includes at least one of the following: computing task identification information, packet data unit PDU session identification information corresponding to the computing task, computing task description information, a DNN, or S-NSSAI, where the computing task description information includes at least one of the following: a type of the computing task, a purpose of the computing task, a service requirement of the computing task, an IP address of the computing task, or port number information corresponding to the computing task.

Optionally, in this embodiment of this application, the apparatus further includes a selection module 803, where the selection module 803 is configured to select a target device based on the third computing task request, where the target device includes either of the following: the session management network element and the computing power control network element.

Optionally, in this embodiment of this application, the selection module 803 is configured to select the target device based on first information included in the third computing task request, where the first information includes at least one of the following: a target area, subscription information corresponding to the target computing task of the terminal device, or computing task description information.

Optionally, in this embodiment of this application, if the target device is the session management network element, the session management network element supports establishing a PDU session for the target computing task; or if the target device is the computing power control network element, the computing power control network element supports selecting a computing network element for the target computing task, and the computing network element is capable of providing the computing power resource corresponding to the target computing task.

Optionally, in this embodiment of this application, the apparatus further includes a sending module 804, where the sending module 804 is configured to send a third computing task response to the terminal device, where the third computing task response includes network element information of a computing network element corresponding to the computing power resource, and/or information about the communication resource.

Optionally, in this embodiment of this application, the third computing task response further includes computing task identification information, and/or PDU session identification information corresponding to the associated computing task.

Optionally, in this embodiment of this application, the sending module 804 is configured to send a PDU session establishment request to the session management network element.

In the apparatus for allocating a resource for a computing task according to this embodiment of this application, the apparatus can obtain the third computing task request, request the computing power control network element to allocate the computing power resource for the target computing task based on the task information of the target computing task that is included in the third computing task request, and request the session management network element to allocate the communication resource for the target computing task. Therefore, it can be ensured that an operator network can allocate the corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

Figure 13:
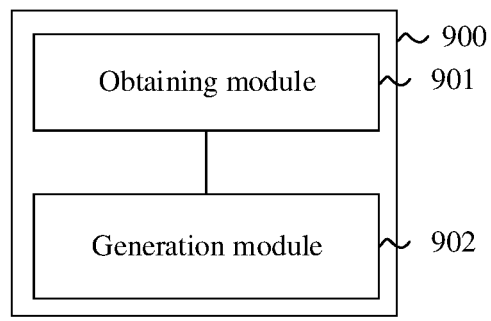
FIG. 13 is a fourth schematic diagram of a structure of an apparatus for allocating a resource for a computing task according to an embodiment of this application.

An embodiment of this application provides an apparatus 900 for allocating a resource for a computing task. As shown in FIG. 13, the apparatus 900 includes an obtaining module 901 and a generation module 902.

The obtaining module 901 is configured to obtain a target QoS policy request, where the target QoS policy request is used to request the policy control network element to generate a target QoS policy corresponding to a target computing task, and the target QoS policy request includes task information of the target computing task. The generation module 902 is configured to generate, based on the task information, the target QoS policy corresponding to the target computing task, where the target QoS policy includes at least one of the following: a computing power QoS policy or a communication QoS policy.

Optionally, in this embodiment of this application, the target QoS policy request includes a communication QoS policy request and/or a computing power QoS policy request, where the communication QoS policy request is used to request the policy control network element to generate the communication QoS policy corresponding to the target computing task, and the computing power QoS policy request is used to request the policy control network element to generate the computing power QoS policy corresponding to the target computing task.

Optionally, in this embodiment of this application, the task information includes at least one of the following: computing task identification information, a PDU session identifier corresponding to the computing task, computing task description information, a DNN, or S-NSSAI.

Optionally, in this embodiment of this application, the obtaining module 901 is configured to obtain the target QoS policy request from a session management network element; and/or obtain the target QoS policy request from a computing power control network element.

Optionally, in this embodiment of this application, the generation module 902 is configured to generate the target QoS policy based on a service requirement of the target computing task.

Optionally, in this embodiment of this application, the generation module is configured to generate a delay policy in the target QoS policy based on a delay requirement in the service requirement of the target computing task; and/or generate a computation accuracy policy in the target QoS policy based on a computation accuracy requirement in the service requirement of the target computing task.

Optionally, in this embodiment of this application, the apparatus further includes a sending module 903, where the sending module 903 is configured to send the target QoS policy to a session management network element; and/or send the target QoS policy to a computing power control network element.

In the apparatus for allocating a resource for a computing task according to this embodiment of this application, the apparatus can obtain the target QoS policy request, and generate, based on the task information of the target computing task that is included in the target QoS policy request, the target QoS policy corresponding to the target computing task, where the target QoS policy includes at least one of the following: the computing power QoS policy or the communication QoS policy. Therefore, it can be ensured that an operator network can allocate a corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

Figure 14:
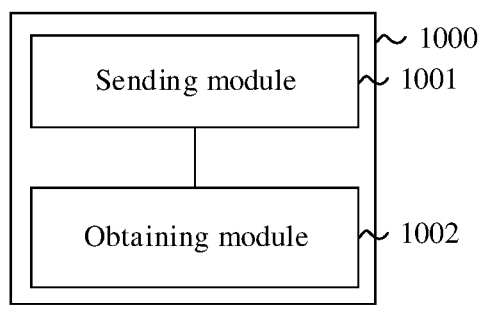
FIG. 14 is a fifth schematic diagram of a structure of an apparatus for allocating a resource for a computing task according to an embodiment of this application.

An embodiment of this application provides an apparatus 1000 for allocating a resource for a computing task. As shown in FIG. 14, the apparatus 1000 includes a sending module 1001 and an obtaining module 1002.

The sending module 1001 is configured to initiate a computing task request to a network-side device, where the computing task request is used to request to allocate a communication resource and/or a computing power resource for a target computing task of the terminal device, and the computing task request includes task information of the target computing task.

The obtaining module 1002 is configured to obtain a computing task response from the network-side device, where the computing task response includes network element information of a computing network element corresponding to the computing power resource allocated for the target computing task, and/or information about the communication resource allocated for the target computing task.

Optionally, in this embodiment of this application, the sending module 1001 is further configured to initiate a computing task request to a network-side device, where the computing task request is used to request to allocate a communication resource and/or a computing power resource for a target computing task of the terminal device, and the computing task request includes task information of the target computing task; and the obtaining module 1002 is configured to obtain a computing task response from the network-side device, where the computing task response includes network element information of a computing network element corresponding to the computing power resource allocated for the target computing task, and/or information about the communication resource allocated for the target computing task.

Optionally, in this embodiment of this application, the task information includes at least one of the following: computing task identification information, PDU session identification information corresponding to the computing task, computing task description information, a DNN, or S-NSSAI, where the computing task description information includes at least one of the following: a type of the computing task, a purpose of the computing task, a service requirement of the computing task, an IP address of the computing task, or port number information corresponding to the computing task.

Optionally, in this embodiment of this application, the sending module 1001 is configured to initiate the computing task request to a target device in the network, where the target device includes at least one of the following: a mobility management network element, a session management network element, or a computing power control network element.

Optionally, in this embodiment of this application, in a case that the target device is the session management network element, the computing task request is a PDU session establishment request.

In the apparatus for allocating a resource for a computing task according to this embodiment of this application, the apparatus can initiate the computing task request (including the task information of the target computing task) to the network-side device to request to allocate the communication resource and/or the computing power resource for the target computing task, and obtain the computing task response from the network-side device, where the computing task response includes the network element information of the computing network element corresponding to the computing power resource allocated for the target computing task of the terminal device, and/or the information about the communication resource allocated for the target computing task of the terminal device. Therefore, it can be ensured that an operator network can allocate the corresponding communication resource for the target computing task of the terminal device. Therefore, data related to the computing task of the terminal device can be transmitted to the computing power resource (for example, the computing network element), computation is performed on the computing power resource (the computing network element) instead, and then a computation result is fed back. In this way, an ordinary terminal device can complete a computing task without having a strong computing capability, thereby reducing costs, power consumption, and the like of the terminal device.

The apparatus for allocating a resource for a computing task in this embodiment of this application may be an apparatus, or an apparatus or an electronic device with an operating system, or may be a component, an integrated circuit, or a chip in a terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not limited in this embodiment of this application.

The apparatus for allocating a resource for a computing task according to this embodiment of this application can implement each process implemented by the foregoing method embodiment, with the same technical effect achieved. To avoid repetition, details are not described herein again.

Figure 15:
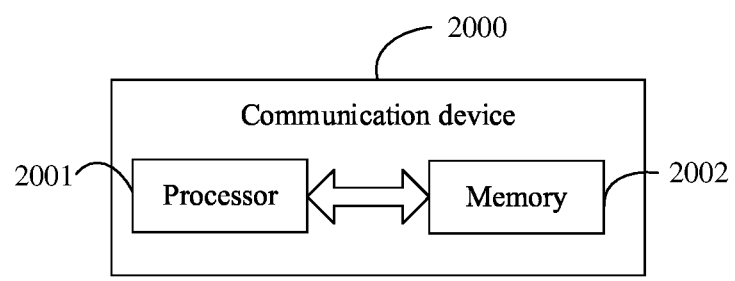
FIG. 15 is a schematic diagram of a structure of a communication device according to an embodiment of this application.

Optionally, as shown in FIG. 15, an embodiment of this application further provides a communication device 2000, including a processor 2001, a memory 2002, and a program or instructions stored in the memory 2002 and executable on the processor 2001. For example, when the communication device 2000 is a terminal, and the program or instructions are executed by the processor 2001, each process of the foregoing embodiment of the method for allocating a resource for a computing task is implemented, with the same technical effect achieved. When the communication device 2000 is a network-side device, and the program or instructions are executed by the processor 2001, each process of the foregoing embodiment of the method for allocating a resource for a computing task is implemented, with the same technical effect achieved. To avoid repetition, details are not described herein again.

An embodiment of this application further provides a terminal device, including a processor and a communication interface. The processor is configured to initiate a computing task request to a network-side device, where the computing task request is used to request to allocate a communication resource and/or a computing power resource for a target computing task of the terminal device, and the computing task request includes task information of the target computing task. The communication interface is configured to obtain a computing task response from the network-side device, where the computing task response includes network element information of a computing network element corresponding to the computing power resource allocated for the target computing task, and/or information about the communication resource allocated for the target computing task.

Figure 16:
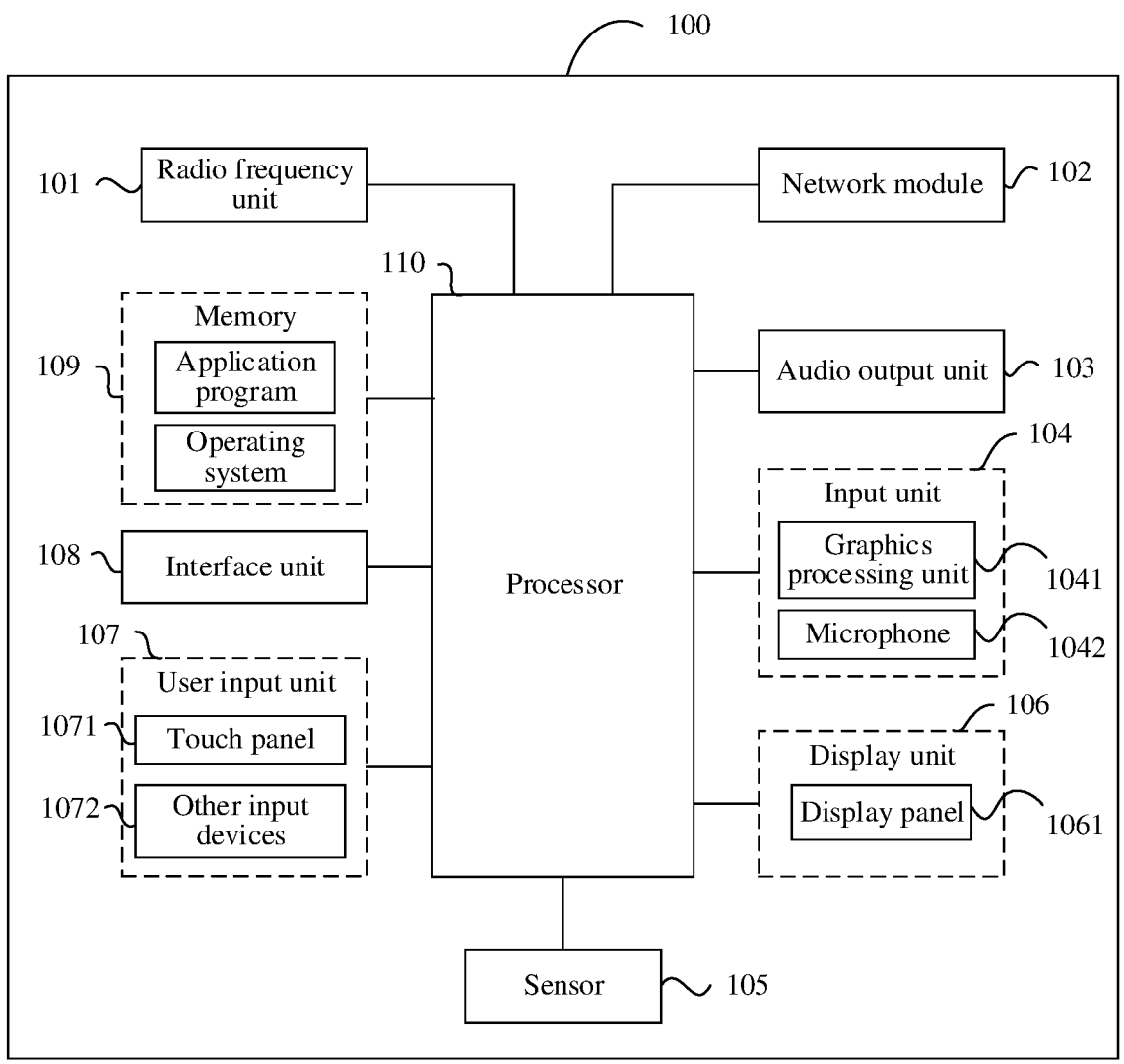
FIG. 16 is a schematic diagram of a structure of a terminal according to an embodiment of this application.

For example, FIG. 16 is a schematic diagram of a structure of a hardware structure of a terminal device for implementing an embodiment of this application.

The terminal 100 includes but is not limited to at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) supplying power to all components. Optionally, the power supply may be logically connected to the processor 110 through a power management system. In this way, functions such as charge management, discharge management, and power consumption management are implemented by using the power management system. The terminal structure shown in FIG. 16 does not constitute a limitation on the terminal. The terminal may include more or fewer components than those shown in the figure, or some components are combined, or component arrangements are different. Details are not described herein again.

It should be understood that, in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control button or a power button), a trackball, a mouse, and a joystick. Details are not described herein again.

In this embodiment of this application, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may primarily include a program or instruction storage area and a data storage area. The program or instruction storage area may store an operating system, an application program or an instruction (such as an audio play function and an image play function) required by at least one function, and the like. In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, the processor 110 may integrate an application processor and a modem processor. The application processor mainly processes the operating system, a user interface, an application program or an instruction, and the like. The modem processor mainly processes wireless communication. For example, the modem processor is a baseband processor. It may be understood that the modem processor may alternatively not be integrated in the processor 110.

The radio frequency unit 101 is configured to initiate a computing task request to a network-side device, where the computing task request is used to request to allocate a communication resource and/or a computing power resource for a target computing task of the terminal device, and the computing task request includes task information of the target computing task. The radio frequency unit 101 is further configured to obtain a computing task response from the network-side device, where the computing task response includes network element information of a computing network element corresponding to the computing power resource allocated for the target computing task, and/or information about the communication resource allocated for the target computing task.

Optionally, in this embodiment of this application, the task information includes at least one of the following: computing task identification information, PDU session identification information corresponding to the computing task, computing task description information, a DNN, or S-NSSAI, where the computing task description information includes at least one of the following: a type of the computing task, a purpose of the computing task, a service requirement of the computing task, an IP address of the computing task, or port number information corresponding to the computing task.

Optionally, in this embodiment of this application, the radio frequency unit 101 is configured to initiate the computing task request to a target device in the network, where the target device includes at least one of the following: a mobility management network element, a session management network element, or a computing power control network element.

Optionally, in this embodiment of this application, in a case that the target device is the session management network element, the computing task request is a PDU session establishment request.

In the terminal device provided in this embodiment of this application, the terminal device can initiate the computing task request (including the task information of the target computing task) to the network-side device to request to allocate the communication resource and/or the computing power resource for the target computing task, and obtain the computing task response from the network-side device, where the computing task response includes the network element information of the computing network element corresponding to the computing power resource allocated for the target computing task of the terminal device, and/or the information about the communication resource allocated for the target computing task of the terminal device. Therefore, it can be ensured that an operator network can allocate the corresponding communication resource for the target computing task of the terminal device. Therefore, data related to the computing task of the terminal device can be transmitted to the computing power resource (for example, the computing network element), computation is performed on the computing power resource instead, and then a computation result is fed back. In this way, an ordinary terminal device can complete a computing task without having a strong computing capability, thereby reducing costs, power consumption, and the like of the terminal device.

An embodiment of this application further provides a network-side device, including a processor and a communication interface. The network-side device embodiment corresponds to the foregoing method embodiment of the network-side device, and each implementation process and implementation of the foregoing method embodiment can be applied to the network-side device embodiment, with the same technical effect achieved.

In an example, the network-side device is a computing power control network element, including a processor and a communication interface. The processor is configured to obtain a first computing task request, where the first computing task request is used to request to allocate a computing power resource for a target computing task of a terminal device, and the first computing task request includes task information of the target computing task; and further configured to allocate the computing power resource for the target computing task based on the task information.

In an example, the network-side device is a session management network element, including a processor and a communication interface. The processor is configured to obtain a second computing task request, where the second computing task request is used to request to allocate a communication resource for a target computing task of a terminal device, and the second computing task request includes task information of the target computing task; and further configured to allocate the communication resource for the target computing task based on the task information.

In an example, the network-side device is a mobility management network element, including a processor and a communication interface. The processor is configured to obtain a third computing task request, where the third computing task request includes task information of a target computing task of a terminal device. The communication interface is configured to send a first computing task request to a computing power control network element, where the first computing task request is used to request to allocate a computing power resource and/or a communication resource for the target computing task; and/or configured to send a second computing task request to a session management network element, where the second computing task request is used to request to allocate a communication resource and/or a computing power resource for the target computing task.

An embodiment of this application further provides a policy control network element, including a processor and a communication interface. The processor is configured to obtain a target QoS policy request, where the target QoS policy request is used to request the policy control network element to generate a target QoS policy corresponding to a target computing task, and the target QoS policy request includes task information of the target computing task; and further configured to generate, based on the task information, the target QoS policy corresponding to the target computing task, where the target QoS policy includes at least one of the following: a computing power QoS policy or a communication QoS policy.

Figure 17:
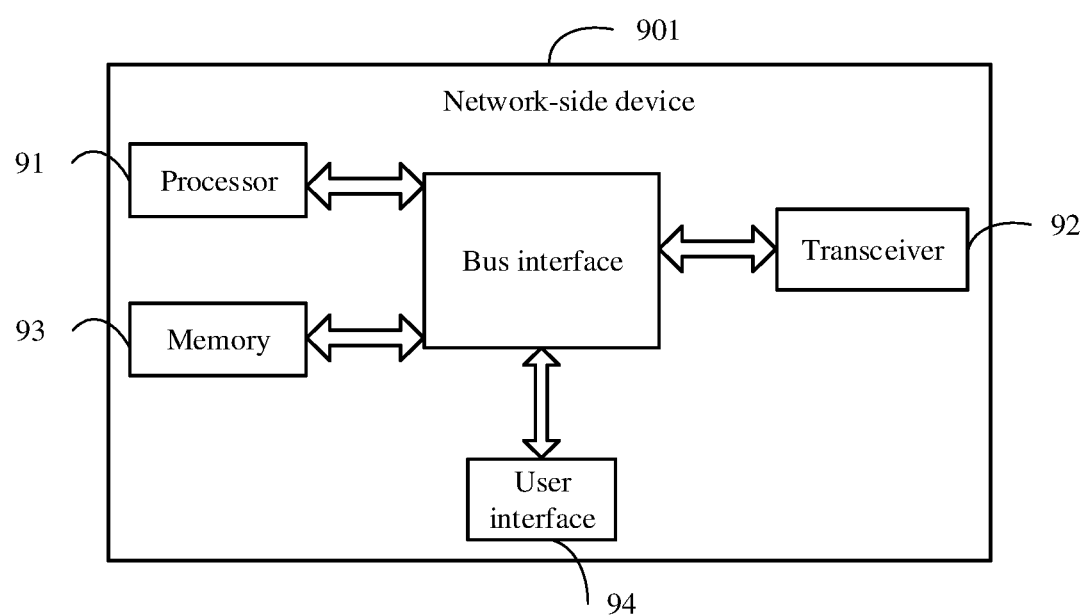
FIG. 17 is a schematic diagram of a structure of a network-side device according to an embodiment of this application.

An embodiment of this application further provides a network-side device 901. As shown in FIG. 17, the network-side device in this embodiment of the present application includes a processor 91, a transceiver 92, a memory 93, a network interface 94, and a bus interface. In FIG. 17, a bus architecture may include any quantity of interconnected buses and bridges, and connects together circuits that are of one or more processors represented by the processor 91 and of a memory represented by the memory 93. The bus architecture may further interconnect various other circuits such as a peripheral device, a voltage regulator, and a power management circuit. These are all well known in the art, and therefore are not described in this specification. The bus interface provides an interface. The transceiver 92 may be a plurality of components, including a transmitter and a receiver, and provides units for communicating with a variety of other apparatuses on a transmission medium. The processor 91 is responsible for management of the bus architecture and general processing, and the memory 93 is capable of storing data that is used by the processor 91 during operation. In addition, the network-side device includes some functional modules that are not shown. Details are not described herein.

For example, the network-side device further includes a program or instructions stored in the memory 93 and executable on the processor 91. When the processor 91 invokes the program or instructions in the memory 93, the method performed by each module shown in FIG. 10, FIG. 11, FIG. 13, or FIG. 14 is performed, with the same technical effect achieved. To avoid repetition, details are not described herein again.

An embodiment of this application further provides a non-transitory readable storage medium. The non-transitory readable storage medium stores a program or instructions. When the program or instructions are executed by a processor, each process of the foregoing method embodiment of the method for allocating a resource for a computing task is implemented, with the same technical effect achieved. To avoid repetition, details are not described herein again.

The processor is a processor in the terminal in the foregoing embodiment. The non-transitory readable storage medium includes a non-transitory computer-readable storage medium, for example, a computer read-only memory (ROM), a random access memory (RAM), a magnetic disk, or an optical disc.

In addition, an embodiment of this application provides a chip. The chip includes a processor and a communication interface. The communication interface is coupled to the processor. The processor is configured to run a program or instructions to implement each process of the foregoing embodiment of the method for allocating a resource for a computing task, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A method for allocating a resource for a computing task, wherein the method comprises:
   obtaining, by a computing power control network element, a first computing task request, wherein the first computing task request is used to request to allocate a computing power resource for a target computing task of a terminal device, and the first computing task request comprises task information of the target computing task; and
   allocating, by the computing power control network element, the computing power resource for the target computing task based on the task information; wherein the method further comprises:
   obtaining, by the computing power control network element, a computing power quality of service (QOS) policy corresponding to the target computing task; and
   the allocating, by the computing power control network element, the computing power resource for the target computing task based on the task information comprises:
   allocating, by the computing power control network element, the computing power resource for the target computing task based on the task information and the computing power QoS policy.

2. The method according to claim 1, wherein the allocating, by the computing power control network element, the computing power resource for the target computing task based on the task information comprises:
   selecting, by the computing power control network element, a computing network element based on the task information, wherein
   the computing network element is capable of providing the computing power resource corresponding to the target computing task.

3. The method according to claim 1, wherein the task information comprises at least one of the following: computing task identification information, packet data unit (PDU) session identification information corresponding to the computing task, computing task description information, a data network name (DNN), or single network slice selection assistance information (S-NSSAI), wherein
   the computing task description information comprises at least one of the following: a type of the computing task, a purpose of the computing task, a service requirement of the computing task, an Internet protocol (IP) address of the computing task, or port number information corresponding to the computing task.

4. The method according to claim 1, wherein the obtaining, by the computing power control network element, a computing power QoS policy corresponding to the target computing task comprises:
   sending, by the computing power control network element, a computing power QoS policy request to a policy control network element, wherein the computing power QoS policy request is used to request the computing power QoS policy corresponding to the target computing task; and obtaining, by the computing power control network element, the computing power QoS policy from the policy control network element; or determining, by the computing power control network element based on a service requirement of the computing task comprised in the task information of the target computing task, the computing power QoS policy corresponding to the target computing task.

5. The method according to claim 4, wherein the sending, by the computing power control network element, a computing power QoS policy request to a policy control network element comprises:

sending, by the computing power control network element, the computing power QoS policy request to the policy control network element through a session management network element; and the obtaining, by the computing power control network element, the computing power QoS policy from the policy control network element comprises:

obtaining, by the computing power control network element, the computing power QoS policy from the policy control network element through the session management network element.

6. The method according to claim 1, wherein the obtaining, by a computing power control network element, a first computing task request comprises:

obtaining, by the computing power control network element, the first computing task request from a first device, wherein the first device comprises any one of the following: a mobility management network element, a session management network element, and an access network device.

7. The method according to claim 1, wherein after the allocating, by the computing power control network element, the computing power resource for the target computing task based on the task information, the method further comprises:

sending, by the computing power control network element, a first computing task response to the terminal device, wherein the first computing task response comprises network element information of a computing network element corresponding to the computing power resource, and the network element information comprises network element identification information or network element address information.

8. The method according to claim 1, wherein the method further comprises:

sending, by the computing power control network element, allocation status information of the computing power resource to a session management network element; or receiving, by the computing power control network element, allocation status information of a communication resource from a session management network element.

9. The method according to claim 1, wherein the service requirement of the computing task comprises at least one of the following: a delay requirement of the computing task or an accuracy requirement of the computing task.

10. A method for allocating a resource for a computing task, wherein the method comprises:

obtaining, by a session management network element, a second computing task request, wherein the second computing task request is used to request to allocate a communication resource for a target computing task of a terminal device, and the second computing task request comprises task information of the target computing task; and allocating, by the session management network element, the communication resource for the target computing task based on the task information; wherein the method further comprises:

obtaining, by the session management network element, a communication quality of service (QOS) policy of the target computing task; and the allocating, by the session management network element, the communication resource for the target computing task based on the task information comprises:

allocating, by the session management network element, the communication resource for the target computing task based on the task information and the communication QoS policy of the target computing task.

11. The method according to claim 10, wherein the allocating, by the session management network element, the communication resource for the target computing task based on the task information comprises:

establishing, by the session management network element, a tunnel in a packet data unit (PDU) session for the terminal device based on the task information, wherein the tunnel in the PDU session is used to transmit data of the target computing task.

12. The method according to claim 10, wherein the method further comprises:

receiving, by the session management network element, a computing power quality of service (QoS) policy request from a computing power control network element, wherein the computing power QoS policy request is used to request a computing power QoS policy corresponding to the target computing task;

sending, by the session management network element, the computing power QoS policy request to a policy control network element;

obtaining, by the session management network element, the computing power QoS policy from the policy control network element; and sending, by the session management network element, the computing power QoS policy to the computing power control network element.

13. The method according to claim 10, wherein the obtaining, by a session management network element, a second computing task request comprises:

obtaining, by the session management network element, the second computing task request from a mobility management network element, wherein the second computing task request comprises a packet data unit (PDU) session establishment request.

14. The method according to claim 10, wherein the method further comprises:

sending, by the session management network element, a second computing task response to the terminal device, wherein the second computing task response comprises some or all information of communication quality of service (QOS) corresponding to the target computing task.

15. The method according to claim 10, wherein the method further comprises:

sending, by the session management network element, a first computing task request to a computing power control network element based on the second computing task request, wherein
the first computing task request is used to request the computing power control network element to allocate a computing power resource for the target computing task.

16. A method for allocating a resource for a computing task in a network, wherein the method comprises:
initiating, by a terminal device, a computing task request to a network-side device, wherein the computing task request is used to request to allocate a communication resource or a computing power resource for a target computing task of the terminal device, and the computing task request comprises task information of the target computing task; wherein the computing task request is used to allocate the computing power resource for the target computing task by a computer power control network element based on the task information and a communication QoS policy of the target computing task, or the computing task request is used to allocate the communication resource for the target computing task by a session management network element based on the task information and a communication quality of service (QOS) policy of the target computing task; and
obtaining, by the terminal device, a computing task response from the network-side device, wherein the computing task response comprises network element information of a computing network element corresponding to the computing power resource allocated for the target computing task, or information about the communication resource allocated for the target computing task.

17. The method according to claim 16, wherein the initiating, by a terminal device, a computing task request to a network-side device comprises:
initiating, by the terminal device, the computing task request to a target device in the network, wherein
the target device comprises at least one of the following:
a mobility management network element, the session management network element, or a computing power control network element.

* * * * *